US012581176B2

(12) United States Patent
Kimura et al.

(10) Patent No.: US 12,581,176 B2
(45) Date of Patent: Mar. 17, 2026

(54) IMAGE SENSOR AND IMAGING DEVICE

(71) Applicant: SONY SEMICONDUCTOR SOLUTIONS CORPORATION, Kanagawa (JP)

(72) Inventors: Katsuji Kimura, Kanagawa (JP); Tetsuhiro Suzuki, Yamagata (JP); Takuya Kudo, Kanagawa (JP); Takayuki Kunimitsu, Kumamoto (JP); Kohei Imayoshi, Kumamoto (JP); Hironobu Tanigawa, Yamagata (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 182 days.

(21) Appl. No.: 18/551,164

(22) PCT Filed: Feb. 15, 2022

(86) PCT No.: PCT/JP2022/005986
§ 371 (c)(1),
(2) Date: Sep. 18, 2023

(87) PCT Pub. No.: WO2022/201976
PCT Pub. Date: Sep. 29, 2022

(65) Prior Publication Data
US 2024/0163538 A1 May 16, 2024

(30) Foreign Application Priority Data

Mar. 26, 2021 (JP) ................................. 2021-054336

(51) Int. Cl.
*H04N 23/54* (2023.01)
*H02K 11/215* (2016.01)
(Continued)

(52) U.S. Cl.
CPC ........... *H04N 23/54* (2023.01); *H02K 11/215* (2016.01); *H02K 41/0354* (2013.01); *H04N 23/50* (2023.01); *H04N 23/6812* (2023.01)

(58) Field of Classification Search
None
See application file for complete search history.

(56) References Cited

U.S. PATENT DOCUMENTS 10,890,734 B1 * 1/2021 Sharma ..................... H02P 6/30
11,412,112 B2 * 8/2022 Wade ................... H04N 23/687
(Continued)

FOREIGN PATENT DOCUMENTS

CN 104767915 A * 7/2015 ............. H04N 23/57
CN 104656043 B * 3/2018 ............. G01D 5/145
(Continued)

OTHER PUBLICATIONS

English translation of CN-104656043-B, Oselekna, 2018 (Year: 2018).*
(Continued)

*Primary Examiner* — James M Hannett
(74) *Attorney, Agent, or Firm* — SHERIDAN ROSS P.C.

(57) ABSTRACT

An image sensor according to the present technology includes: a semiconductor substrate in which a plurality of pixels each having a photoelectric conversion element is two-dimensionally arranged; and a magnetic detection unit configured to detect a magnetic change according to a change in a relative position with respect to an imaging lens that guides light from a subject to the pixels.

20 Claims, 28 Drawing Sheets

(51) Int. Cl.

| | |
|---|---|
| *H02K 41/035* | (2006.01) |
| *H04N 23/50* | (2023.01) |
| *H04N 23/68* | (2023.01) |

(56) References Cited

U.S. PATENT DOCUMENTS

| | | | | | |
|---|---|---|---|---|---|
| 11,804,320 | B2 * | 10/2023 | Shikama | ................. | H04N 23/54 |
| 11,831,986 | B2 * | 11/2023 | Sharma | .................. | H04N 23/57 |
| 11,956,544 | B2 * | 4/2024 | Mahmoudzadeh | .. | H04N 23/687 |
| 11,979,664 | B2 * | 5/2024 | Park | ....................... | H04N 23/57 |
| 2011/0032645 | A1 | 2/2011 | Noel et al. | | |
| 2018/0128649 | A1 * | 5/2018 | Terajima | .............. | H02K 41/031 |
| 2018/0173080 | A1 * | 6/2018 | Enta | ........................ | H04N 23/57 |

FOREIGN PATENT DOCUMENTS

| | | | | | |
|---|---|---|---|---|---|
| JP | | 2005345504 A | | 12/2005 | |
| JP | | 2009122544 A | | 6/2009 | |
| JP | | 2010-129930 | | 6/2010 | |
| JP | | 2011-090759 | | 5/2011 | |
| JP | | 2012-129613 | | 7/2012 | |
| JP | | 2015-146022 | | 8/2015 | |
| JP | | 2016-224262 | | 12/2016 | |
| JP | | 2017-058169 | | 3/2017 | |
| KR | | 20190023185 A | * 3/2019 | ............. | G03B 13/36 |
| WO | | WO-2018147697 A1 | * 8/2018 | ............. | G03B 30/00 |

OTHER PUBLICATIONS

English translation of CN-104767915-A, Miller, 2015 (Year: 2015).*
English translation of KR-20190023185-A , Park, 2019 (Year: 2019).*
English translation of WO-2018147697-A1, Lee, 2018 (Year: 2018).*
International Search Report and Written Opinion prepared by the Japan Patent Office on May 2, 2022, for International Application No. PCT/JP2022/005986, 2 pgs.

* cited by examiner 51 (IMAGING UNIT)

| CAP LAYER | |
| FREE MAGNETIC LAYER | |
| INTERMEDIATE LAYER | } 31 |
| FIXED MAGNETIC LAYER | |
| BASE LAYER | |

| FIRST MAGNETIC LAYER | |
| NONMAGNETIC LAYER | } FIXED MAGNETIC LAYER |
| SECOND MAGNETIC LAYER | (THREE-LAYER TYPE) |

| MAGNETIC LAYER | } FIXED MAGNETIC LAYER |
| ANTIFERROMAGNETIC LAYER | (ANTIFERROMAGNETIC TYPE) |

36
35

31'
36
35

39
31'
36
35

39
31
36
35

39
40
31
36
35

38
37
39
40
31
36
35

*FIG. 19*
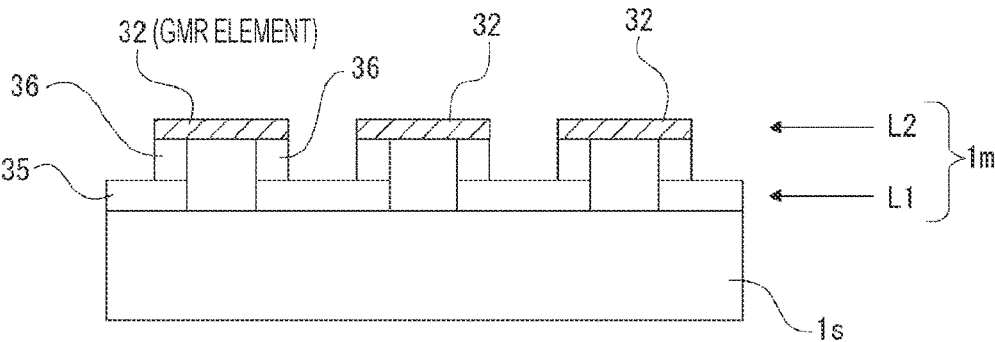
*FIG. 20A*
*FIG. 20B*
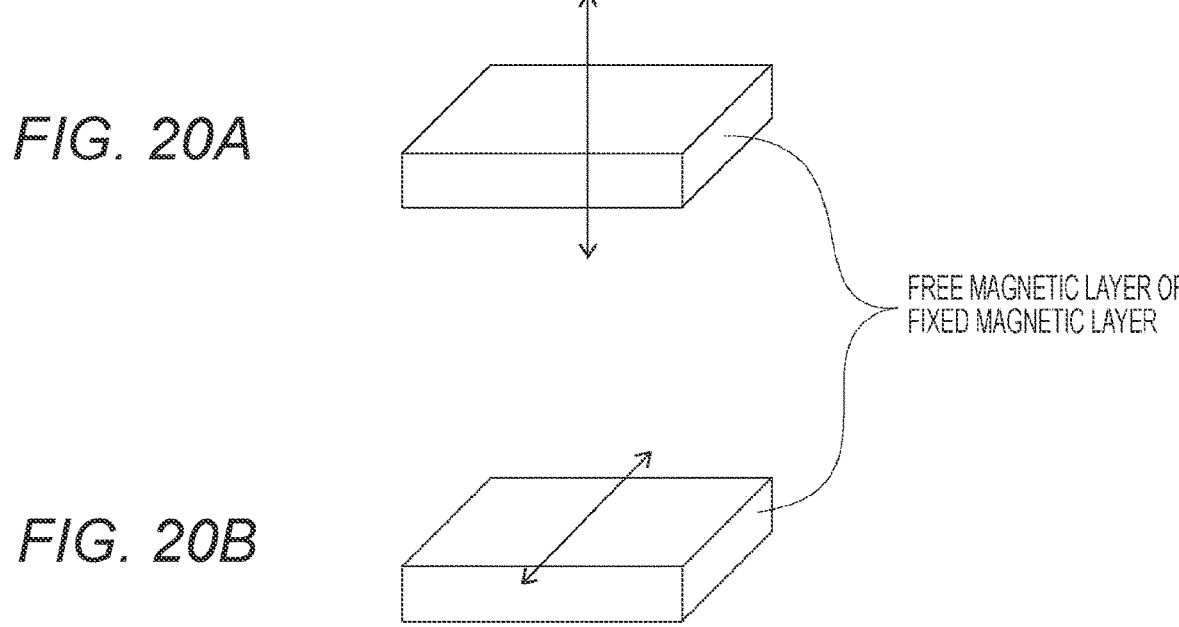
FREE MAGNETIC LAYER OR
FIXED MAGNETIC LAYER

IMAGE SENSOR AND IMAGING DEVICE

CROSS REFERENCE TO RELATED APPLICATIONS

This application is a national stage application under 35 U.S.C. 371 and claims the benefit of PCT Application No. PCT/JP2022/005986, having an international filing date of 15 Feb. 2022, which designated the United States, which PCT application claimed the benefit of Japanese Patent Application No. 2021-054336, filed 26 Mar. 2021, the entire disclosures of each of which are incorporated herein by reference.

TECHNICAL FIELD

The present technology relates to an image sensor and an imaging device, and particularly relates to a technology of detecting a relative position between an image sensor and an imaging lens by a magnetic sensor.

BACKGROUND ART

A camera module, particularly a camera module in a mobile terminal such as a smartphone, is becoming more highly functional, and a magnetic sensor using a Hall element or the like for position detection of an imaging lens is installed in the camera module for optical shake correction.

For example, Patent Document 1 below discloses a camera module including four Hall elements in order to detect a position of an imaging lens in a direction orthogonal to an optical axis.

CITATION LIST

Patent Document

Patent Document 1: Japanese Patent Application Laid-Open No. 2015-146022

SUMMARY OF THE INVENTION

Problems to be Solved by the Invention

Here, as in the camera module of Patent Document 1 described above, since a magnetic sensor for lens position detection is mounted as an independent component in a conventional camera module, providing the magnetic sensor causes an increase in size of the camera module.

The present technology has been made in view of the circumstances described above, and an object thereof is to suppress an increase in size due to provision of a magnetic detection unit, in an imaging unit that includes an imaging lens and an image sensor and performs imaging.

Solutions to Problems

An image sensor according to the present technology includes: a semiconductor substrate in which a plurality of pixels each having a photoelectric conversion element is two-dimensionally arranged; and a magnetic detection unit configured to detect a magnetic change according to a change in a relative position with respect to an imaging lens that guides light from a subject to the pixels.

According to the configuration described above, the magnetic detection unit is provided in the image sensor.

Furthermore, an imaging device according to the present technology includes: an image sensor having a semiconductor substrate in which a plurality of pixels each having a photoelectric conversion element is two-dimensionally arranged, and a magnetic detection unit configured to detect a magnetic change according to a change in a relative position with respect to an imaging lens that guides light from a subject to the pixels; and an image signal processing unit configured to perform signal processing on a captured image signal obtained by the image sensor.

Such an imaging device can also provide a similar action to that of the image sensor according to the present technology described above.

BRIEF DESCRIPTION OF DRAWINGS

FIG. 7 is a diagram illustrating an electrical configuration related to optical shake correction in the imaging unit of the first embodiment.

FIG. 11 is a view schematically illustrating a change mode of a detection value of each magnetic sensor according to tilt of the imaging lens.

FIG. 19 is an explanatory view of an example of forming a GMR element in the embodiment.

FIGS. 20A and 20B are explanatory views of perpendicular magnetic anisotropy and in-plane magnetic anisotropy.

MODE FOR CARRYING OUT THE INVENTION

Hereinafter, embodiments will be described in the following order.

<1. First embodiment>
(1-1. Configuration of imaging device)
(1-2. Configuration of imaging unit)
<2. Second embodiment>
<3. Magnetoresistive effect element>
<4. Modification>
<5. Summary of embodiment>
<6. Present technology>

1. First Embodiment (1-1. Configuration of Imaging Device)

Figure 1:
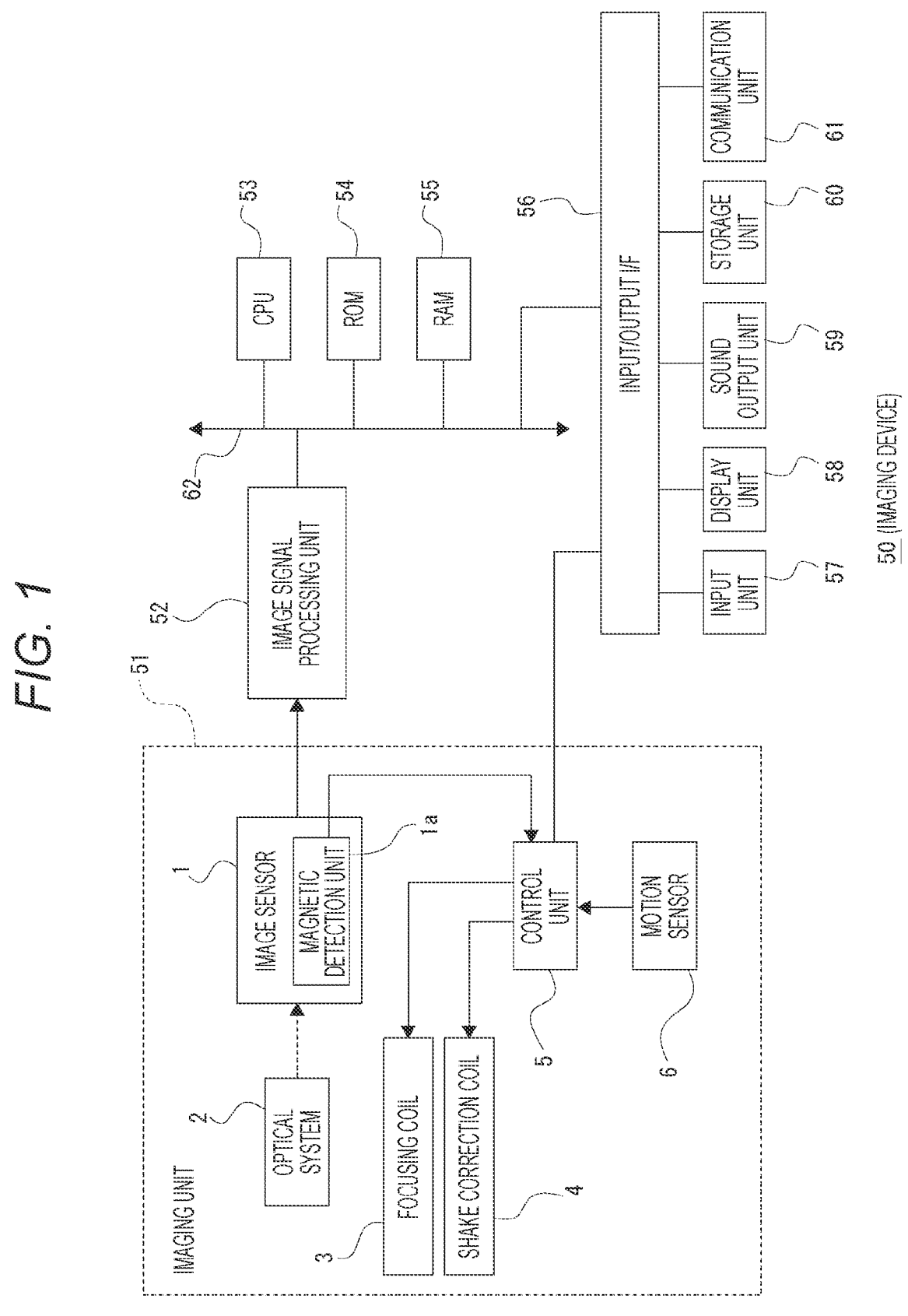
FIG 1. is a diagram illustrating an internal configuration example of an imaging device including an image sensor as a first embodiment according to the present technology.

FIG. 1 is a diagram illustrating an internal configuration example of an imaging device 50 including an image sensor 1 as a first embodiment according to the present technology.

In the present example, the imaging device 50 is configured as a mobile information processing apparatus such as a smartphone or a tablet terminal.

As illustrated, the imaging device 50 includes an imaging unit 51 configured to perform imaging and having an optical system 2 and the image sensor 1 which are for imaging, and an image signal processing unit 52 configured to be input with a captured image signal obtained by the image sensor 1 and perform predetermined signal processing.

Furthermore, the imaging device 50 includes a central processing unit (CPU) 53, a read only memory (ROM) 54, a random access memory (RAM) 55, an input/output interface 56, an input unit 57, a display unit 58, a sound output unit 59, a storage unit 60, a communication unit 61, and a bus 62.

The imaging unit 51 has a focusing coil 3, a shake correction coil 4, a control unit 5, and a motion sensor 6, together with the image sensor 1 and the optical system 2 described above.

The image sensor 1 includes, for example, a charge coupled device (CCD) image sensor, a complementary metal oxide semiconductor (CMOS) image sensor, or the like. The image sensor 1 has a semiconductor substrate (a semiconductor substrate is to be described later) in which a plurality of pixels each having a photoelectric conversion element such as a photodiode is two-dimensionally arranged, for example, and the image sensor 1 outputs an electric signal obtained by photoelectric conversion for every pixel as a captured image signal.

In the present example, the image sensor 1 has a magnetic detection unit 1*a*. This magnetic detection unit 1*a* is configured to detect a magnetic change according to a change in a relative position with respect to an imaging lens (an imaging lens 10), which will be described later, included in the optical system 2, and details of this magnetic detection unit 1*a* will be described again.

The optical system 2 has optical components for imaging, including the imaging lens 10 to be described later which is for guiding light from a subject to the pixels of the image sensor 1.

The focusing coil 3 constitutes an actuator which is for realizing focus adjustment by displacing in an optical axis direction.

The shake correction coil 4 constitutes an actuator which is for realizing optical shake correction by displacing the imaging lens 10 in a direction orthogonal to the optical axis.

Note that a mechanical configuration example for displacing the imaging lens 10 for the focus adjustment and the optical shake correction will be described again.

The control unit 5 performs drive control of the focusing coil 3 and the shake correction coil 4 to realize the focus adjustment and the optical shake correction.

For the control of the focusing coil 3, autofocus control based on a predetermined control method such as, for example, a contrast method or a phase difference method is performed.

Furthermore, the shake correction coil 4 is controlled on the basis of a detection value of the motion sensor 6.

The motion sensor 6 includes, for example, an acceleration sensor or a gyro sensor, and detects a motion of the imaging device 50.

The control unit 5 drives the shake correction coil 4 on the basis of motion information detected by the motion sensor 6 so as to cancel a shake (for example, a camera shake) accompanying the motion of the imaging device 50.

At this time, the control unit 5 controls driving of the shake correction coil 4 so as to prevent the imaging lens 10 from sticking to an end position of a movable range of the optical shake correction, on the basis of information about a position of the imaging lens 10 calculated on the basis of a detection value of the magnetic detection unit 1*a*.

Note that such sticking prevention control is a technique that is generally performed, and a detailed description thereof will be omitted here.

The image signal processing unit 52 performs pre-processing, synchronization processing, YC generation processing, resolution conversion processing, codec processing, and the like on a captured image signal input from the image sensor 1.

In the pre-processing, clamping processing of clamping black levels of R, G, and B to a predetermined level, correction processing among color channels of R, G, and B, or the like is performed on the captured image signal from the image sensor 1. In the synchronization processing, color separation processing is performed such that image data for each pixel has all the R, G, and B color components. For example, in the case of an imaging element using a Bayer array color filter, demosaic processing is performed as color separation processing. In the YC generation processing, a luminance (Y) signal and a color (C) signal are generated (separated) from image data of R, G, and B. In the resolution conversion processing, the resolution conversion processing is executed on image data subjected to various signal processing.

In the codec processing, for example, encoding processing for recording or communication and file generation are performed on the image data subjected to the various types of processing described above. In the codec processing, it is possible to generate a file in a format such as moving picture experts group (MPEG)-2 or H.264 as a moving image file format. It is also conceivable to generate a file in a format such as joint photographic experts group (JPEG), tagged image file format (TIFF), or graphics interchange format (GIF) as a still image file.

The CPU 53 executes various types of processing according to a program stored in the ROM 54 or a program loaded from the storage unit 60 described later into the RAM 55. The RAM 55 also appropriately stores data and the like necessary for the CPU 53 to execute various types of processing.

The CPU 53, the ROM 54, and the RAM 55 are connected to one another via the bus 62.

The image signal processing unit 52 is connected to this bus 62. As a result, the image signal processing unit 52 can communicate with the CPU 53 and cause the storage unit 60 to store a generated image file, via the input/output interface 56 to be described later.

The input/output interface 56 is also connected to the bus 62.

The input/output interface 56 can be connected with the input unit 57 for a user to perform an input operation, the display unit 58 including a liquid crystal panel, an organic electroluminescence (EL) panel, or the like, the sound output unit 59 including a speaker or the like, the storage unit 60, the communication unit 61, and the like.

The input unit 57 means an input device used by a user who uses the imaging device 50.

For example, as the input unit 57, various operators and operation devices such as a keyboard, a mouse, a key, a dial, a touch panel, a touch pad, and a remote controller are assumed. An operation by the user is detected by the input unit 57, and a signal corresponding to the input operation is interpreted by the CPU 53.

The display unit 58 displays various types of information on the basis of an instruction from the CPU 53. For example, the display unit 58 displays an image based on the image file stored in the storage unit 60 as described above, and performs display as various operation menus, icons, messages, and the like, that is, a graphical user interface (GUI).

The storage unit 60 includes, for example, a storage medium such as a hard disk drive (HDD) or a solid state memory. This storage unit 60 is used not only for storing various types of content data such as the image file described above but also for storing program data for the CPU 53 to execute various types of processing.

The communication unit 61 performs communication processing via a network including the Internet and wired or wireless communication (for example, near field communication or the like) with a peripheral device.

Furthermore, the control unit 5 in the imaging unit 51 is connected to the input/output interface 56. As a result, the CPU 53 can communicate with the control unit 5 via the input/output interface 56.

(1-2. Configuration of Imaging Unit)

Figure 2:
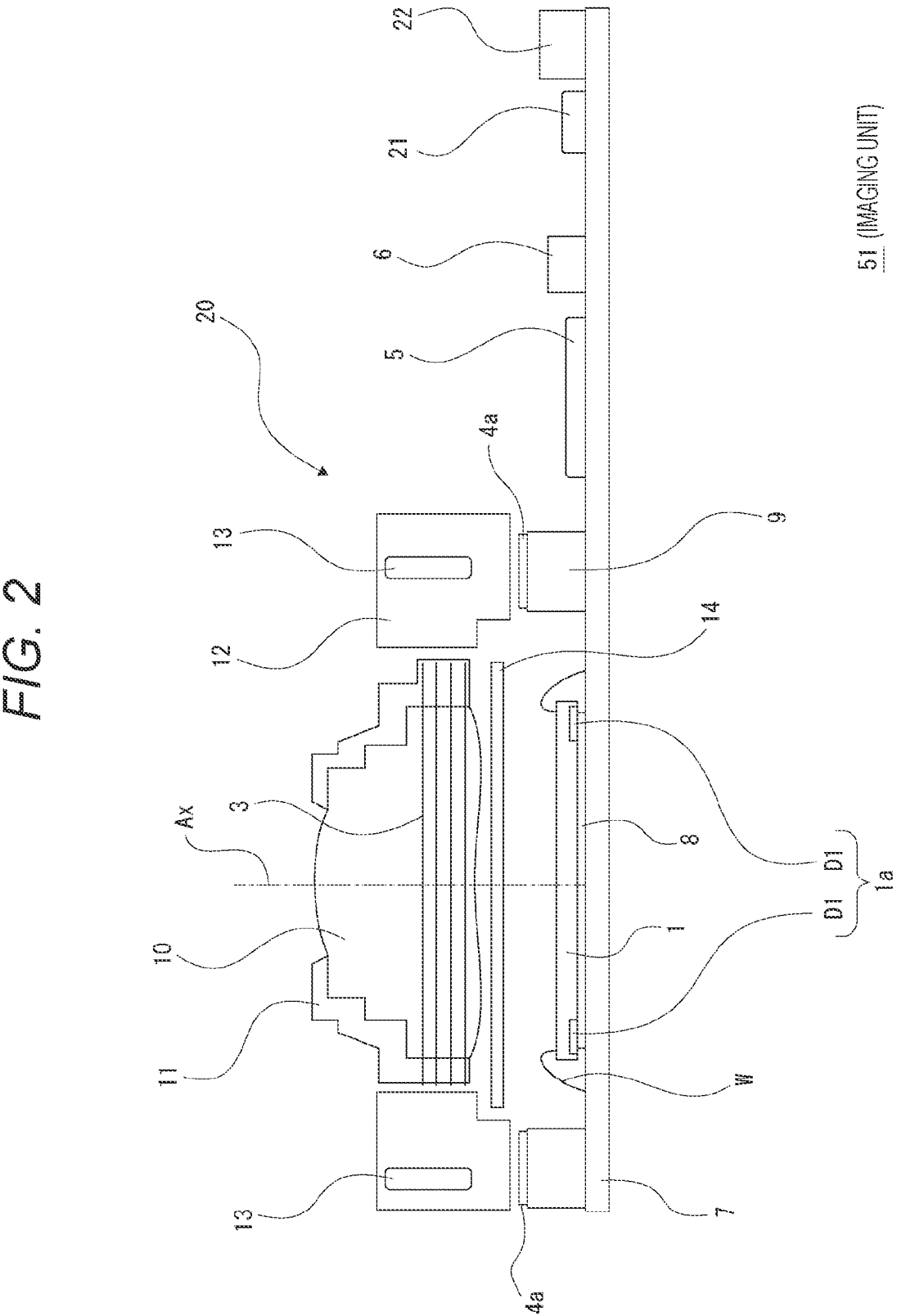
FIG. 2 is a schematic longitudinal cross-sectional view of an imaging unit included in the imaging device as the first embodiment.
Figure 3:
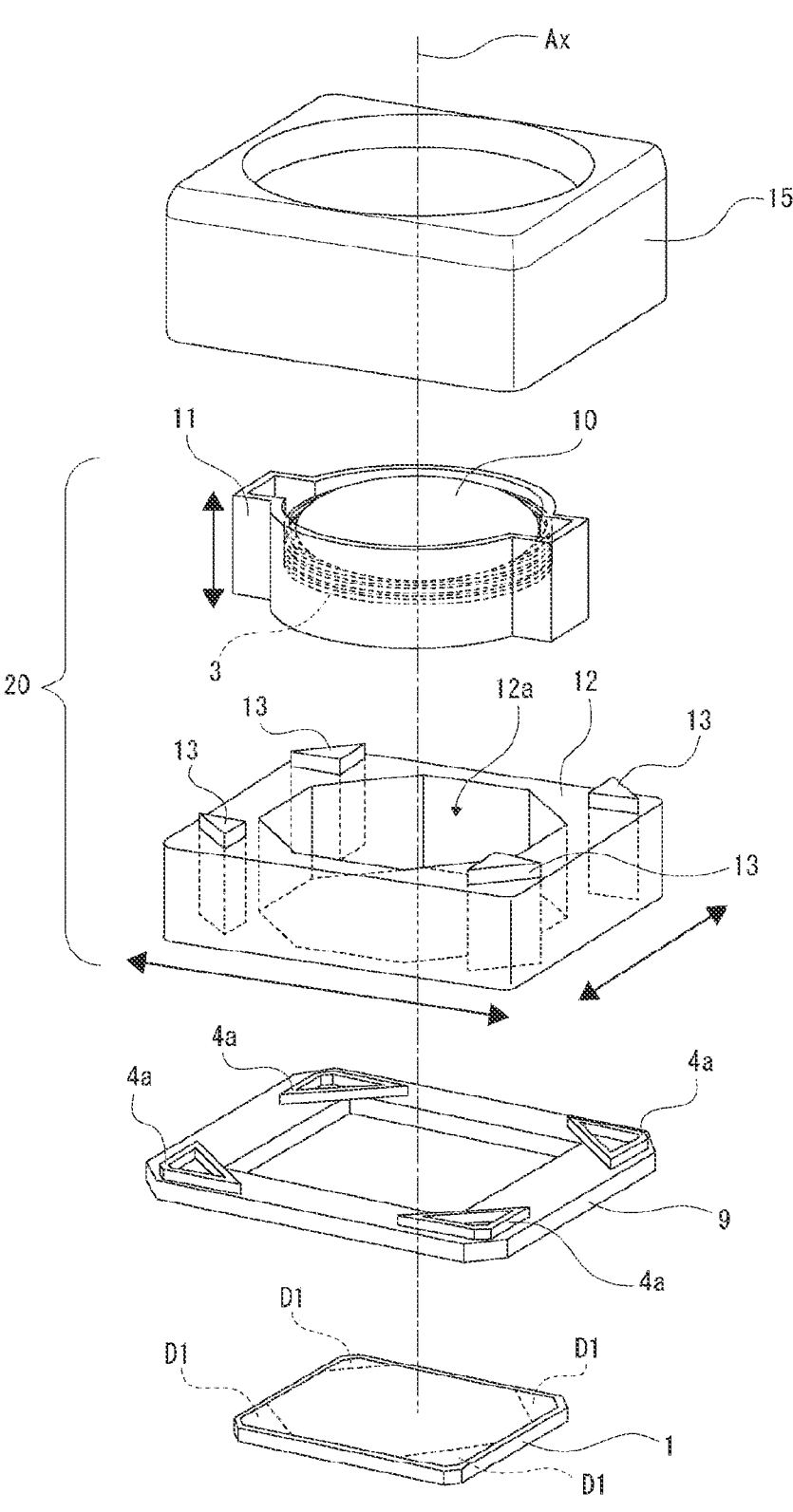
FIG. 3 is an exploded perspective view of a part of the imaging unit including a movable unit.

With reference to FIGS. 2 and 3, a mechanical configuration of the imaging unit 51 will be described.

FIG. 2 is a schematic longitudinal cross-sectional view of the imaging unit 51, and FIG. 3 is an exploded perspective view of a part of the imaging unit 51 including a movable unit 20 which is for displacing the imaging lens 10 for focus adjustment and optical shake correction.

As illustrated in FIG. 2, in the imaging unit 51, the image sensor 1 is physically connected onto a wiring substrate 7 by an adhesive 8, and is electrically and physically connected to the wiring substrate 7 by wire bonding using a bonding wire W. The wiring substrate 7 is, for example, an interposer substrate, and functions as a circuit substrate for externally outputting an electric signal of the image sensor 1.

On the wiring substrate 7, a spacer 9 is formed so as to surround the image sensor 1. This spacer 9 is a spacer for securing a clearance between the image sensor 1 and the optical system 2.

On the spacer 9, a plurality of coils 4a constituting the shake correction coil 4 is formed, and the movable unit 20 is disposed above these coils 4a.

As illustrated in FIGS. 2 and 3, the movable unit 20 includes: the imaging lens 10; a lens holder 11 that holds the imaging lens 10; the focusing coil 3 wound around an outer periphery of the imaging lens 10; a lens unit holder 12 that supports the lens holder 11 so as to be displaceable in a direction of a reference optical axis Ax, and is also supported itself from the wiring substrate 7 side so as to be displaceable in a direction orthogonal to the reference optical axis Ax; and a plurality of magnets 13 including permanent magnets and provided in the lens unit holder 12.

Here, the reference optical axis Ax means an optical axis of an imaging optical system when a correction amount of optical shake correction by moving the imaging lens 10 (or the image sensor 1) is zero. This reference optical axis Ax can be rephrased as an optical axis when the imaging lens 10 is in a neutral position in design.

The lens unit holder 12 has an opening 12a in a central portion. In a state where the imaging lens 10 is in a neutral position, a lens unit including the imaging lens 10, the lens holder 11, and the focusing coil 3 is accommodated in the opening 12a.

The magnets 13 are individually disposed at positions to be four corners of the lens unit holder 12.

In the movable unit 20, these four magnets 13 and the focusing coil 3 function as a focus actuator that displaces the imaging lens 10 in the direction of the reference optical axis Ax. Specifically, when the focusing coil 3 is energized, the above-described lens unit including the imaging lens 10 is displaced in the direction of the reference optical axis Ax by interaction between a magnetic field of the magnet 13 and a magnetic field caused by a current flowing through the focusing coil 3.

Furthermore, the four magnets 13 also function as a part of an actuator for optical shake correction.

FIG. 3 illustrates the spacer 9 illustrated and the plurality of coils 4a formed on the spacer 9 in FIG. 1 together with the movable unit 20.

As illustrated, the coils 4a are individually disposed at positions to be four corners of the spacer 9 formed in a substantially rectangular frame shape. As a result, each coil 4a faces one magnet 13 disposed at a corresponding corner among the four magnets 13 formed on the lens unit holder 12 side in the direction of the reference optical axis Ax (see also FIG. 2).

By adopting such a configuration, by controlling a current flowing through the four coils 4a to control magnetic fields acting on the individual magnets 13, a position of the lens unit holder 12 in a direction orthogonal to the reference optical axis Ax can be changed. As described above, the lens unit including the imaging lens 10 is supported by the lens unit holder 12. Therefore, when the lens unit holder 12 is displaced in a direction orthogonal to the reference optical axis Ax as described above, a position of the imaging lens 10 in the direction orthogonal to the reference optical axis Ax also changes in conjunction with the displacement. That is, as a result, it becomes possible to perform optical shake correction by changing the position of the imaging lens 10 in a direction orthogonal to the reference optical axis Ax.

Note that, in FIG. 3, a shield cover 15 (not illustrated in FIG. 2) is illustrated. The shield cover 15 functions as a protective cover that covers the movable unit 20 and the spacer 9 (and the image sensor 1 positioned inside thereof) on the wiring substrate 7.

In FIG. 2, although not illustrated in FIG. 3, an infrared ray (IR) cut filter 14 is disposed between the movable unit 20 and the image sensor 1. As a result, infrared light can be cut in light incident on the image sensor 1 from the imaging lens 10.

Furthermore, in FIG. 2, on the wiring substrate 7, an integrated circuit (IC) chip of the control unit 5 and the motion sensor 6 described in FIG. 1 are mounted, and a memory unit 21 is mounted. The memory unit 21 is a storage device that stores a correction value for correcting a variation in an induced electromotive force subjected to lens position detection.

Furthermore, the wiring substrate 7 is provided with a connector unit 22 in which various input/output terminals are formed.

Here, the image sensor 1 of the present embodiment is provided with the magnetic detection unit 1a that detects a magnetic change according to a change in a relative position with respect to the imaging lens 10 (FIGS. 2 and 3).

In the present example, the magnetic detection unit 1a has a plurality of magnetic sensors D1 that detects a magnetic change according to a change in the relative position with respect to the imaging lens 10 in a direction orthogonal to the reference optical axis Ax.

Specifically, as illustrated in FIG. 3, the magnetic detection unit 1a has four magnetic sensors D1 individually disposed at four corner positions of the image sensor 1.

Each magnetic sensor D1 has a magnetoresistive effect element. The magnetoresistive effect means a phenomenon in which electric resistance changes when a magnetic field is applied. As will be described later, in the present example, a tunnel magneto resistance (TMR) sensor (a TMR sensor 30 described later) that performs magnetic detection by a TMR effect is used as the magnetic sensor D1.

The TMR effect is a type of magnetoresistive effect, and is a phenomenon in which electric resistance changes depending on a magnetization direction of two layers of ferromagnets sandwiching an insulator in a magnetic tunnel junction (MTJ) element. In general, the resistance is low in a case where the magnetization of the two layers of ferromagnets is directed in the same direction (a parallel state), and the resistance is high in a case where the magnetization is directed in opposite directions to each other (an antiparallel state).

Since the TMR sensor can be formed using a semiconductor manufacturing process, the TMR sensor can be formed very small inside the image sensor 1.

As will be described later, in the present example, each magnetic sensor D1 is formed inside the image sensor 1, for example, in a wiring layer (a wiring layer 1m described later) layered on the semiconductor substrate 1s.

Here, as can be seen with reference to FIGS. 2 and 3, an outer size of the lens unit holder 12 in which the four magnets 13 are formed, specifically, an outer size in a plane orthogonal to the reference optical axis Ax is larger than the same outer size of the image sensor 1. Therefore, each of the magnetic sensors D1 formed at the four corners of the image sensor 1 are positioned on an inner peripheral side of each of the magnets 13 formed at the four corners of the lens unit holder 12.

Figure 4:
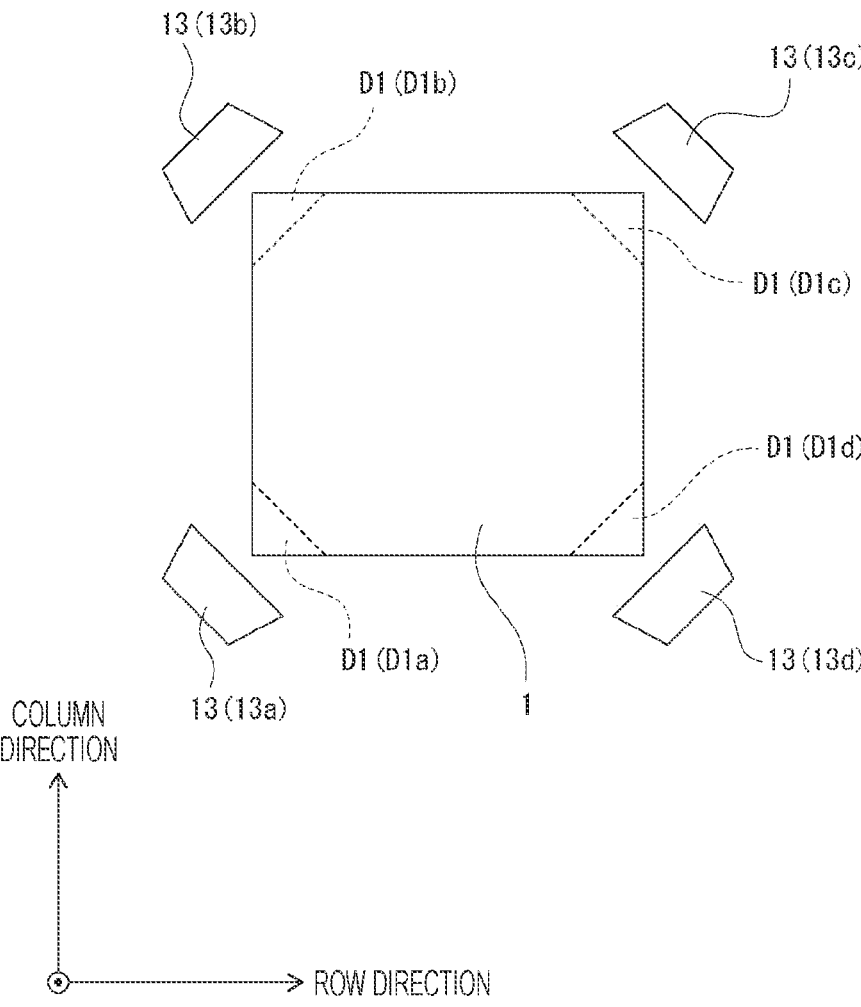
FIG. 4 is a view schematically illustrating a positional relationship between each magnetic sensor formed in the image sensor and each magnet formed in a lens unit holder.

FIG. 4 is a view schematically illustrating a positional relationship between each magnetic sensor D1 formed in the image sensor 1 and each magnet 13 formed in the lens unit holder 12.

Here, it is assumed that a horizontal direction of the page is a row direction of the image sensor 1, and a vertical direction is a column direction of the image sensor 1.

As illustrated, the magnetic sensors D1 disposed at the four corners of the image sensor 1 are individually distinguished as magnetic sensors D1a, D1b, D1c, and D1d. The magnetic sensors D1a and D1b are positioned at one end portion in the row direction of the image sensor 1, and the magnetic sensors D1c and D1d are positioned at another end portion in the row direction of the image sensor 1. Furthermore, the magnetic sensors D1a and D1d are positioned at one end portion in the column direction of the image sensor 1, and the magnetic sensors D1b and D1c are positioned at another end portion in the column direction of the image sensor 1.

Furthermore, the magnets 13 are also individually distinguished as magnets 13a, 13b, 13c, and 13d. As illustrated, it is assumed that the magnet 13 positioned closest to the magnetic sensor D1a is defined as the magnet 13a, and the magnet 13 positioned closest to the magnetic sensor D1b is defined as the magnet 13b. Similarly, it is assumed that the magnet 13 positioned closest to the magnetic sensor D1c defined as the magnet 13c, and the magnet 13 positioned closest to the magnetic sensor D1d defined as the magnet 13d. As described for confirmation, being closest here means that a position in a direction orthogonal to the reference optical axis Ax is the closest.

Figure 5:
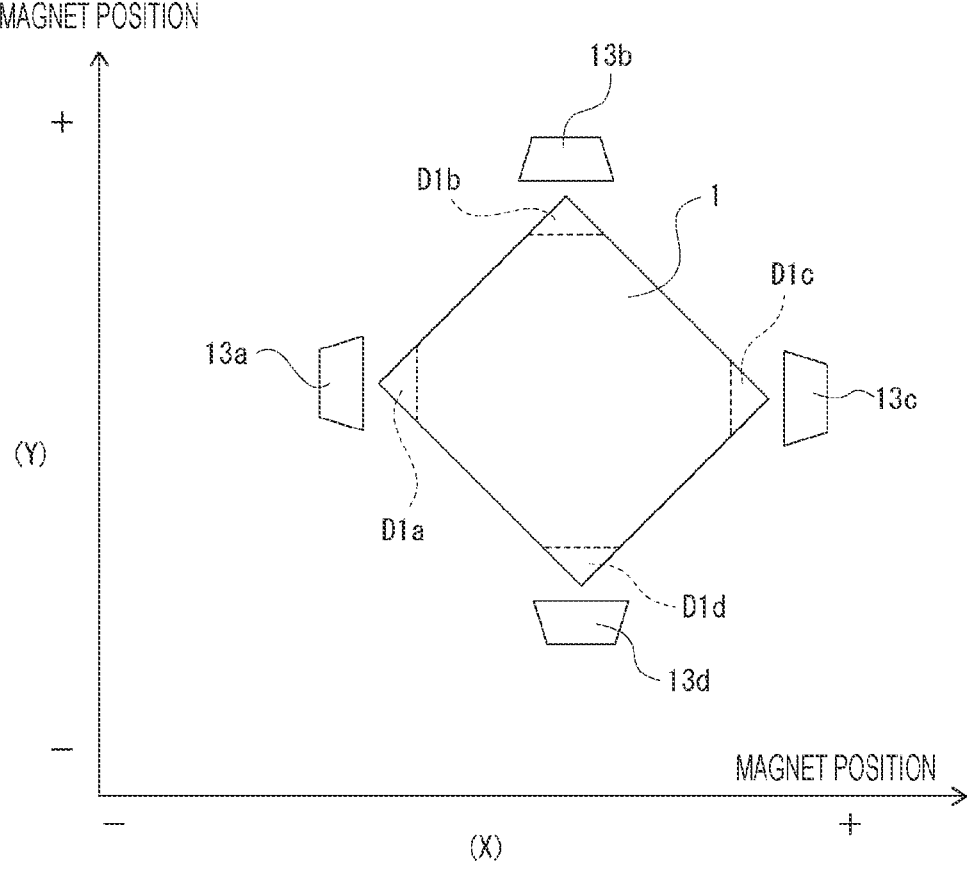
FIG. 5 is an explanatory view of an X-axis direction and a Y-axis direction.
Figure 6:
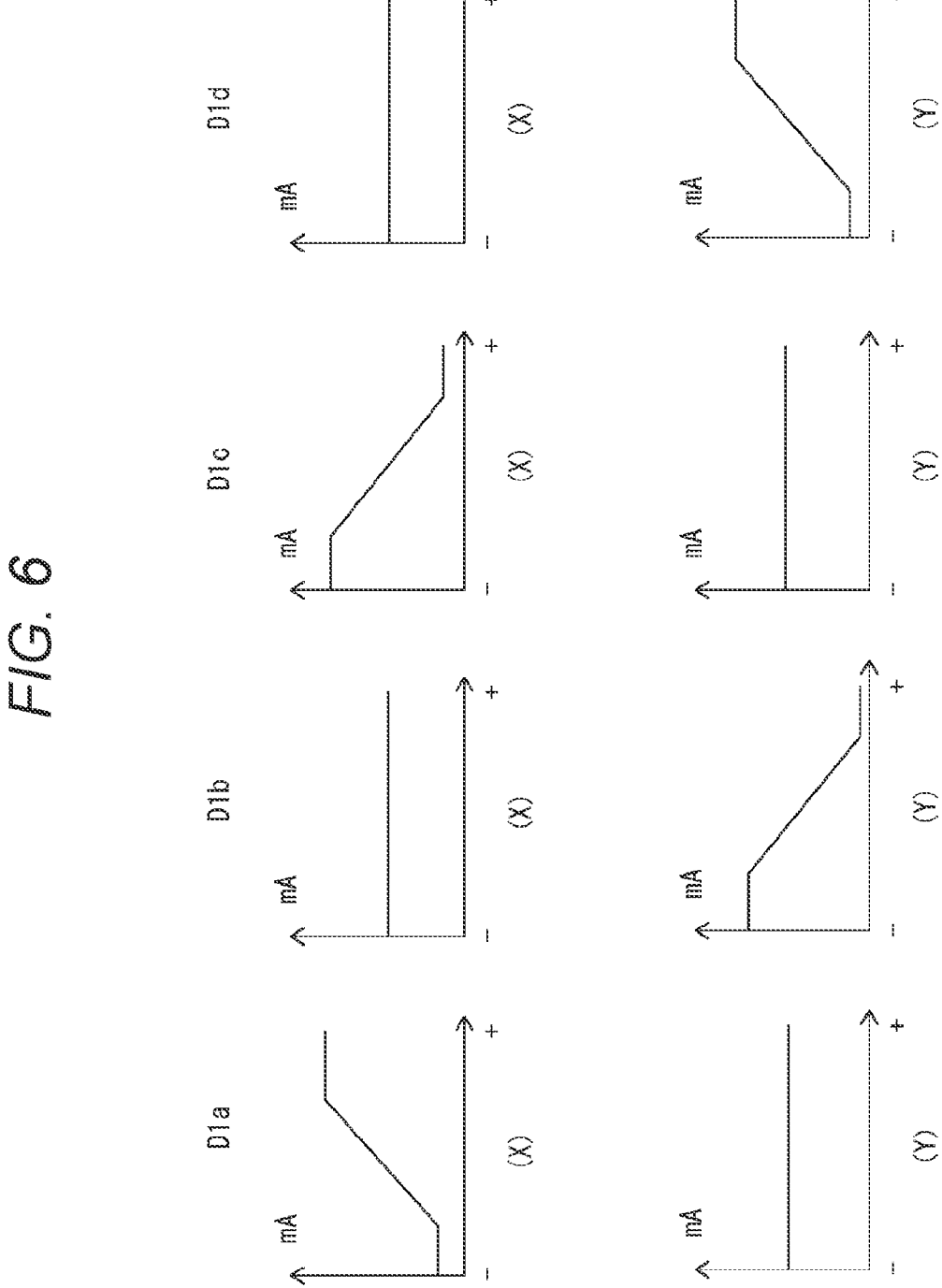
FIG. 6 is a view schematically illustrating a change mode of a detection value of each magnetic sensor according to displacement of an imaging lens.

With reference to FIGS. 5 and 6, a description is given to the fact that a position in a direction orthogonal to the reference optical axis Ax of the imaging lens 10 can be detected by the magnetic sensors D1a, D1b, D1c, and D1d disposed as described above.

Here, as an example, displacement of the imaging lens 10 in an X-axis direction and a Y-axis direction as illustrated in FIG. 5 is considered. The X-axis direction is a direction shifted by 45 degrees with respect to the row direction of the image sensor 1 among directions orthogonal to the reference optical axis Ax, and the Y-axis direction is a direction orthogonal to the X-axis direction among directions orthogonal to the reference optical axis Ax.

Polarities of "+" and "−" in each of the X-axis direction and the Y-axis direction define distinction of a displacement direction in each axis from a neutral position of the imaging lens 10.

FIG. 6 schematically illustrates a change mode of a detection value of each magnetic sensor D1 according to displacement of the imaging lens 10. Specifically, FIG. 6 schematically illustrates, for each of the magnetic sensors D1a, D1b, D1c, and D1d, a change mode of a detection value with respect to displacement of the imaging lens 10 in the X-axis direction (an upper part in the figure), and a change mode of a detection value with respect to displacement of the imaging lens 10 in the Y-axis direction (a lower part in the figure).

Here, it is assumed that each magnetic sensor D1 is configured such that a detection value increases as a distance from the magnet 13 decreases.

When the imaging lens 10 is displaced from the − side to the + side in the X-axis direction, the magnet 13a approaches the magnetic sensor D1a, while the magnet 13c moves away from the magnetic sensor D1c. Therefore, when the imaging lens 10 is displaced from the − side to the + side in the X-axis direction, a detection value of the magnetic sensor D1a gradually increases, and a detection value of the magnetic sensor D1c gradually decreases.

Furthermore, with respect to displacement of the imaging lens 10 in the X-axis direction, distances from the magnetic sensors D1b and D1d respectively to the magnets 13b and 13d do not substantially change. Therefore, detection values of the magnetic sensors D1b and D1d hardly change with respect to the displacement of the imaging lens 10 in the X-axis direction.

Whereas, when the imaging lens 10 is displaced from the − side to the + side in the Y-axis direction, distances from the magnetic sensors D1a and D1c respectively to the magnets 13a and 13c do not substantially change. Furthermore, for the magnetic sensors D1b and D1d, the magnet 13d approaches the magnetic sensor D1d, while the magnet 13b moves away from the magnetic sensor D1b.

Therefore, when the imaging lens 10 is displaced from the − side to the + side in the Y-axis direction, detection values of the magnetic sensors D1a and D1c do not substantially change. Furthermore, for the magnetic sensors D1b and D1d, a detection value of the magnetic sensor D1d gradually increases, and a detection value of the magnetic sensor D1b gradually decreases.

As described above, in the magnetic sensors D1a, D1b, D1c, and D1d, there is a difference in change in each detection value between the displacement in the X-axis direction and the displacement in the Y-axis direction of the imaging lens 10. On the basis of the difference in change in the detection value for each of such magnetic sensors D1, a position of the imaging lens 10 in an X-Y plane, that is, a position in any direction orthogonal to the reference optical axis Ax can be detected.

Figure 7:
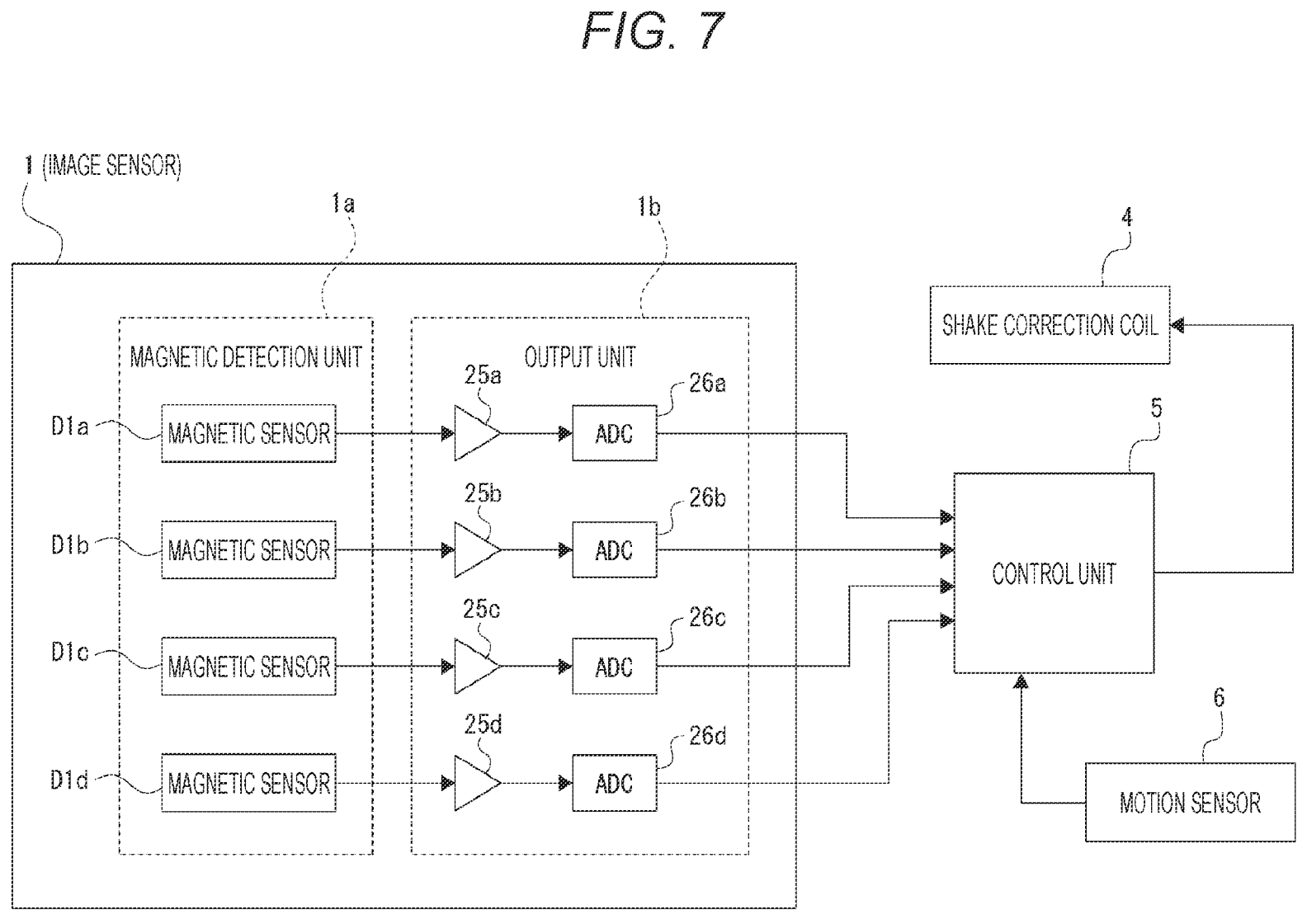

FIG. 7 is a diagram illustrating an electrical configuration related to optical shake correction in the imaging unit 51.

As illustrated, in the image sensor 1, the magnetic detection unit 1a having the magnetic sensors D1a, D1b, D1c, and D1d is provided, and an output unit 1b that outputs magnetic detection values of four systems for the individual magnetic sensors D1a, D1b, D1c, and D1d is provided including amplifiers 25a, 25b, 25c, and 25d and analog to digital converters (ADCs) 26a, 26b, 26c, and 26d that respectively amplify detection signals from the magnetic sensors D1a, D1b, D1c, and D1d, and convert the detection signals into digital values.

The control unit 5 detects a position of the imaging lens 10 by being input with magnetic detection values of these four systems, and performing predetermined calculation based on a difference in change in the detection value for each of the magnetic sensors D1a, D1b, D1c, and D1d with respect to displacement of the imaging lens 10 as described above.

As described above, the control unit 5 realizes optical shake correction by driving the shake correction coil 4 on the basis of a detection signal of the motion sensor 6, and performs control to prevent the imaging lens 10 from sticking to an end position in the movable range of the optical shake correction, on the basis of information about the detected position of the imaging lens 10.

Here, in order to realize position detection of the imaging lens 10 in a direction orthogonal to the reference optical axis Ax, it suffices that the number of the magnetic sensors D1 is at least two.

Figure 8:
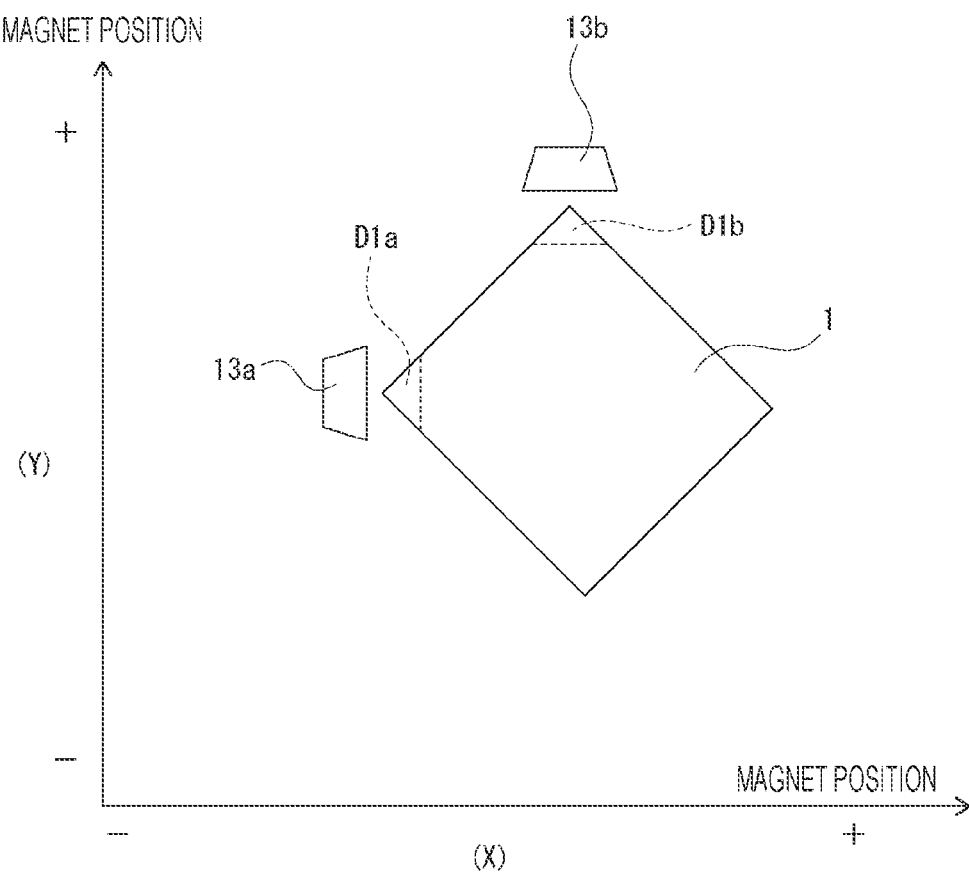
FIG. 8 is an explanatory view of an example in which only two magnetic sensors are provided.

FIG. 8 illustrates a case where only the magnetic sensors D1a and D1b are provided as the magnetic sensor D1 in the image sensor 1.

Figure 9:
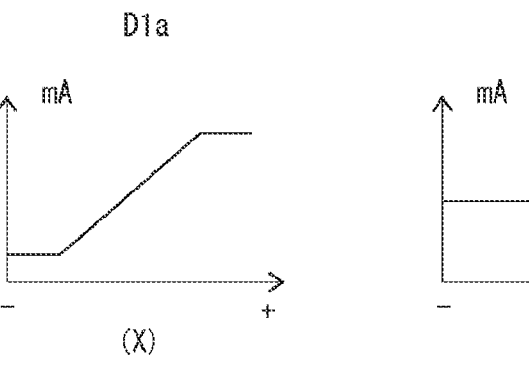
FIG. 9 is a view illustrating a change mode of a detection value according to displacement of the imaging lens for each magnetic sensor illustrated in FIG. 8, similarly to FIG. 6.
Figure 9:
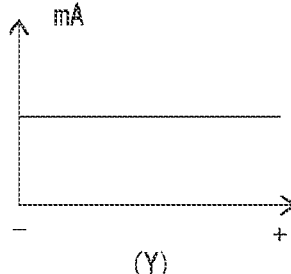
Figure 9:
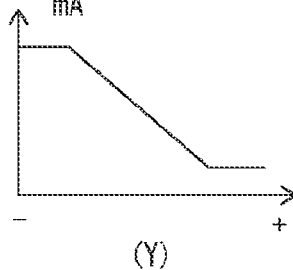

Furthermore, in FIG. 9, a change mode of detection values of the magnetic sensors D1a and D1b according to displacement of the imaging lens 10 is illustrated similarly to FIG. 6 above.

As can be seen with reference to FIGS. 8 and 9, even in a case where only the magnetic sensors D1a and D1b are used, a change characteristic of a detection value in a case where the imaging lens 10 is displaced in the X-axis direction is different from that in a case where the imaging lens is displaced in the Y-axis direction for every magnetic sensor D1. Therefore, position detection in any direction orthogonal to the reference optical axis Ax of the imaging lens 10 becomes possible on the basis of detection values of the magnetic sensors D1.

Note that, although only the magnetic sensors D1a and D1b are provided in the example here, position detection in a direction orthogonal to the reference optical axis Ax of the imaging lens 10 is similarly possible also in a case where only the magnetic sensors D1c and D1d are provided.

Here, each of a relationship between the magnetic sensors D1a and D1b and a relationship between the magnetic sensors D1c and D1d correspond to a relationship between a "first direction magnetic sensor" and a "second direction magnetic sensor" in the present technology.

Specifically, the first direction magnetic sensor is a magnetic sensor in which a change amount of a detection value according to displacement of the imaging lens 10 in a first direction (for example, in the X-axis direction), which is a predetermined direction among directions orthogonal to the reference optical axis Ax, is larger than a change amount of a detection value according to displacement of the imaging lens 10 in a second direction (for example, in the Y-axis direction), which is a direction orthogonal to the reference optical axis Ax and is a direction orthogonal to the first direction.

Whereas, the second direction magnetic sensor is a magnetic sensor in which a change amount of a detection value according to displacement of the imaging lens 10 in the second direction described above is larger than a change amount of a detection value according to displacement of the imaging lens 10 in the first direction described above.

By providing at least two of the magnetic sensor D1 corresponding to the first direction magnetic sensor and the magnetic sensor D1 corresponding to the second direction magnetic sensor as the magnetic sensors D1 as described above, position detection in any direction orthogonal to the reference optical axis Ax of the imaging lens 10 becomes possible.

In the present embodiment, since the magnetic sensors D1 are disposed at the four corner positions of the image sensor 1, it is also possible to detect a tilt angle of the imaging lens 10 in correspondence to a case of performing control to tilt the imaging lens 10 as optical shake correction.

Figure 10:
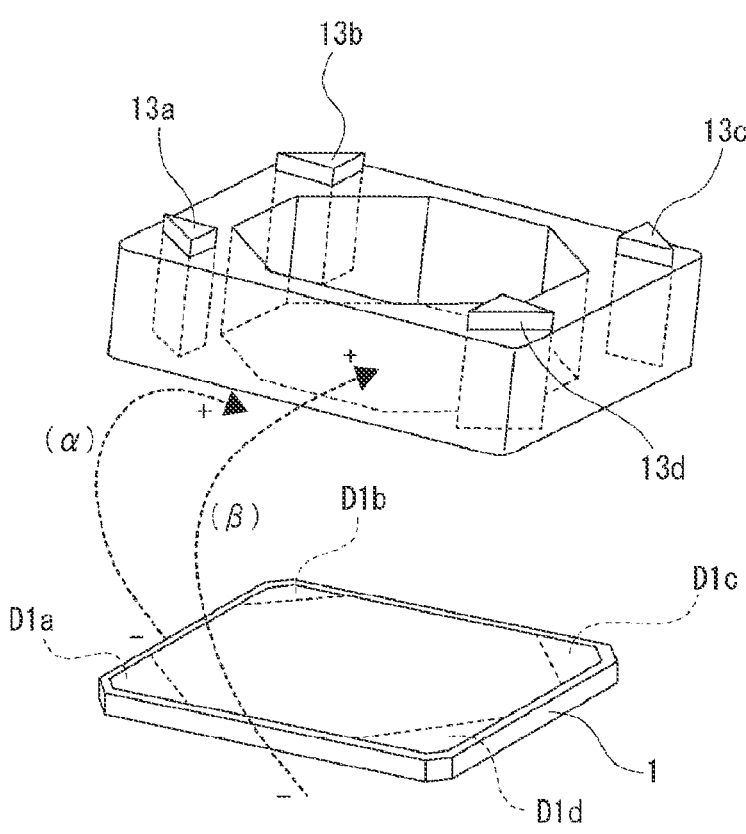
FIG. 10 is an explanatory view of tilt of the imaging lens.

FIG. 10 is an explanatory view of tilt of the imaging lens 10.

As the tilt, tilt in two directions of an α direction and a β direction illustrated in the figure is considered.

It is assumed that the tilt in the α direction is, for example, tilt in which an axis of the imaging lens 10 is inclined in a plane parallel to the row direction of the image sensor 1, while the tilt in the β direction is, for example, tilt in which the axis of the imaging lens 10 is inclined in a plane parallel to the column direction of the image sensor 1.

Polarities of "+" and "−" in each of the α direction and the β direction illustrated in the figure define a polarity of an inclination angle based on a state in which the imaging lens 10 is in a neutral position.

Figure 11:
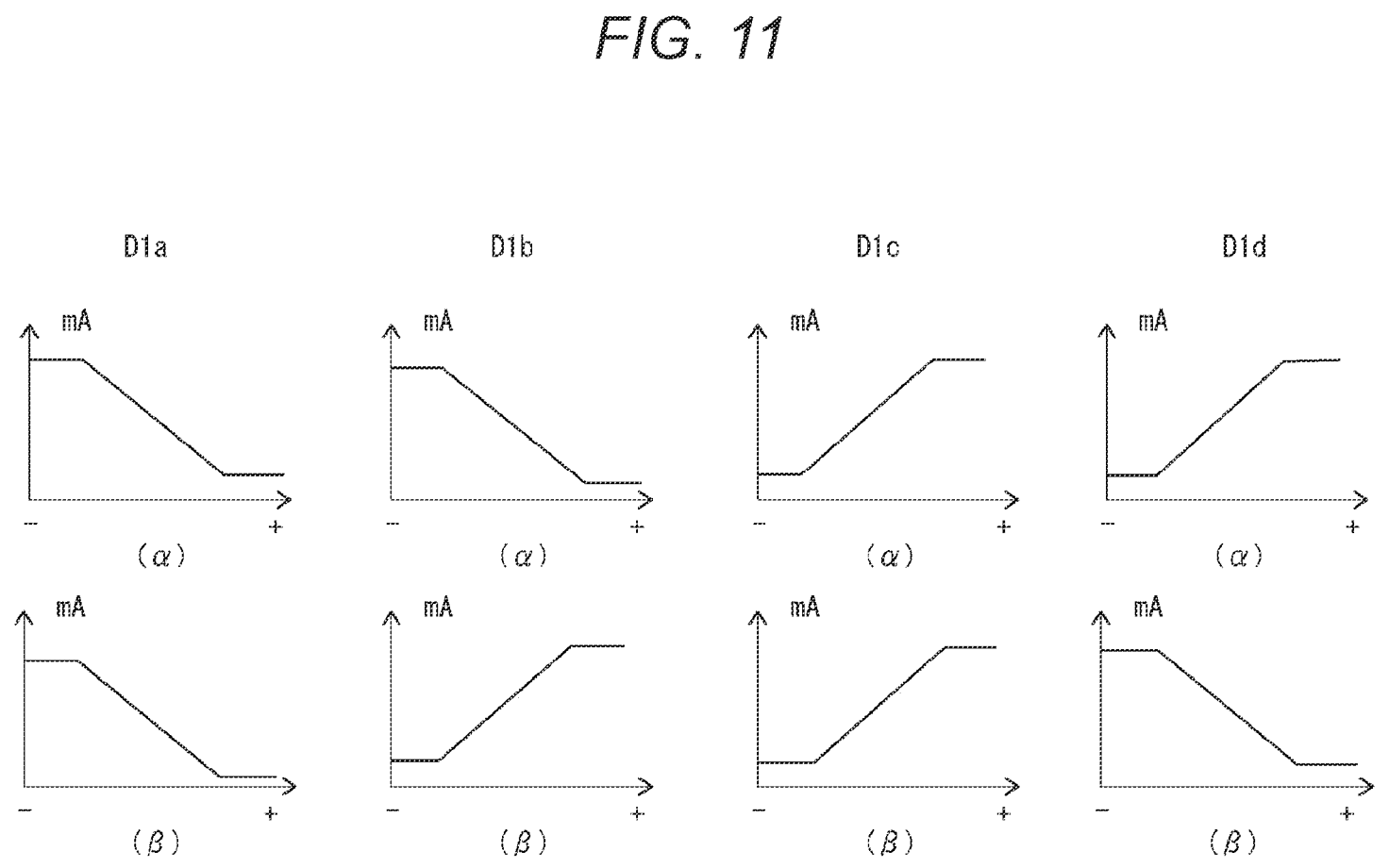

FIG. 11 schematically illustrates a change mode of a detection value of each magnetic sensor D1 according to tilt of the imaging lens 10, and schematically illustrates, specifically, a change mode of a detection value with respect to tilt of the imaging lens 10 in the α direction (an upper part in the figure), and a change mode of a detection value with respect to tilt of the imaging lens 10 in the β direction (a lower part in the figure), for each of the magnetic sensors D1a, D1b, D1c, and D1d.

When the imaging lens 10 is tilted from the − side to the + side in the α direction, the magnets 13c and 13d respectively approach the magnetic sensors D1c and D1d, while the magnets 13a and 13b respectively move away from the magnetic sensors D1a and D1b. Therefore, when the imaging lens 10 is displaced from the − side to the + side in the α direction, detection values of the magnetic sensors D1c and D1d gradually increase, and detection values of the magnetic sensors D1a and D1b gradually decrease.

Whereas, when the imaging lens 10 tilts from the − side to the + side in the β direction, the magnets 13b and 13c respectively approach the magnetic sensors D1b and D1c, and the magnets 13a and 13d respectively move away from the magnetic sensors D1a and D1d. Therefore, with respect to the tilt from the − side to the + side in the β direction, detection values of the magnetic sensors D1b and D1c gradually increase, and detection values of the magnetic sensors D1a and D1d gradually decrease.

By providing the magnetic sensors D1 at the four corner positions of the image sensor 1 in this manner, there is a difference in a change pattern of a detection value of each magnetic sensor D1 with respect to the tilt in the α direction and the tilt in the β direction of the imaging lens 10. Therefore, a tilt angle of the imaging lens 10 in any direction can be detected on the basis of such a difference in a change pattern.

Here, in order to enable tilt detection of the imaging lens 10, the magnetic detection unit 1a is only required to satisfy the following configuration conditions.

That is, the condition is that the magnetic detection unit 1a has: two magnetic sensors D1 (in the example described above, a set of the magnetic sensors D1a and D1d or a set of the magnetic sensors D1b and D1c) positioned to face each other at both end portions in the row direction in the image sensor 1; and two orthogonal-direction magnetic sensors (in the example described above, a set of the magnetic sensors D1a and D1b, or a set of the magnetic sensors D1c and D1d) positioned to face each other at both end portions in the column direction of the image sensor 1.

As described above, an inclination angle in the α direction when the imaging lens 10 is tilted in the α direction can be detected by the two magnetic sensors D1 positioned to face each other at both end portions in the row direction, and an inclination angle in the β direction when the imaging lens 10 is inclined in the β direction can be detected by the two magnetic sensors D1 positioned to face each other at both end portions in the column direction.

Note that, according to the condition described above, it is understood that the number of magnetic sensors D1 required to enable tilt detection is only required to be at least three or more instead of four or more. Specifically, the tilt detection can also be performed by providing only the magnetic sensors D1a, D1b, and D1d, for example. In this case, "two magnetic sensors D1 positioned to face each other at both end portions in the row direction" correspond to a set of the magnetic sensors D1a and D1d, and "two magnetic sensors D1 positioned to face each other at both end portions in the column direction" correspond to a set of the magnetic sensors D1a and D1b.

2. Second Embodiment

Next, a second embodiment will be described.

The second embodiment enables position detection in a direction of a reference optical axis Ax of an imaging lens 10.

Note that, in the following description, the same reference numerals are given to portions similar to those already described, and description thereof will be omitted.

Figure 12:
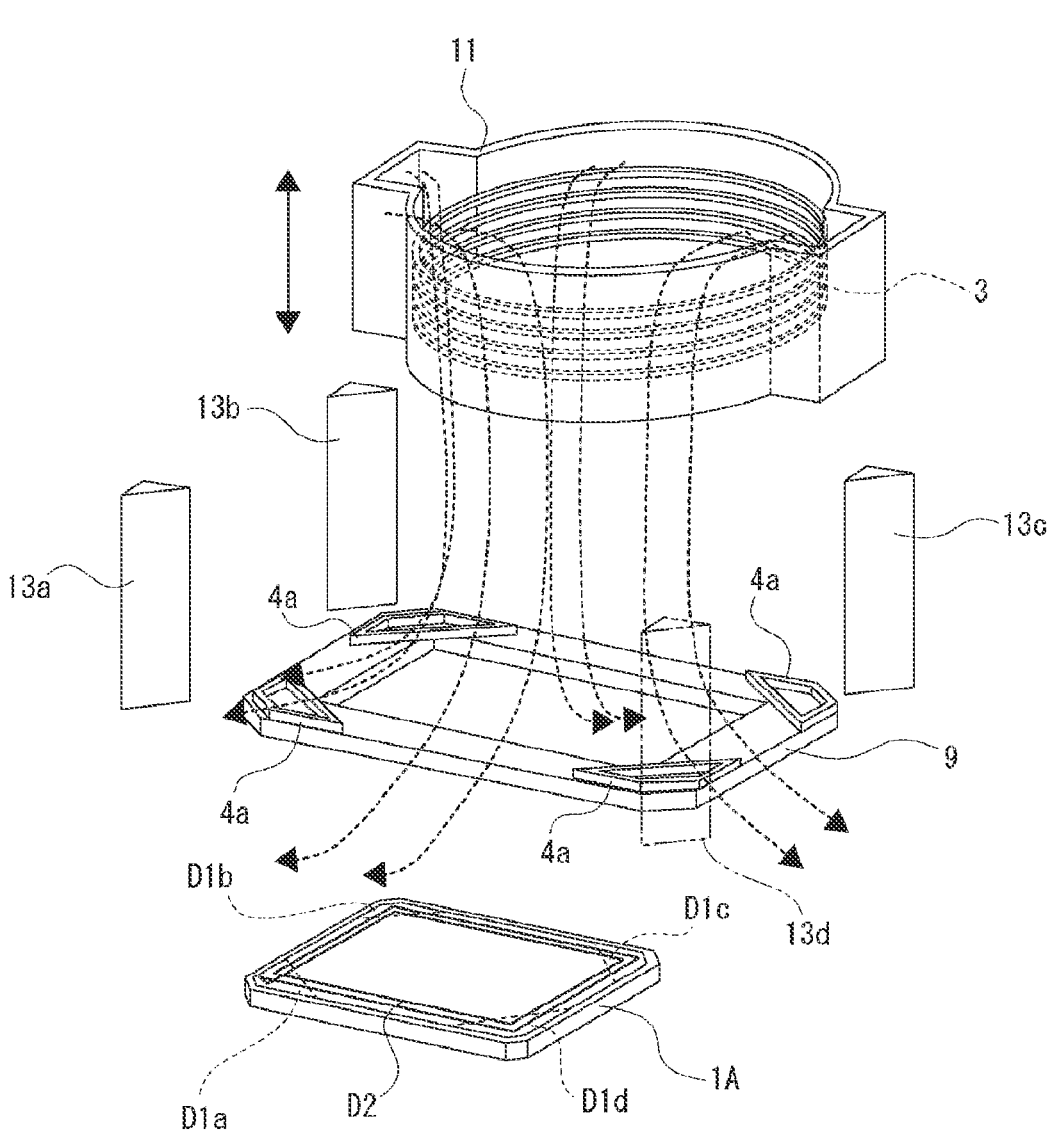
FIG. 12 is a view for explaining a configuration of an image sensor as a second embodiment.

FIG. 12 is a view for explaining a configuration of an image sensor 1A as the second embodiment. Note that FIG. 12 illustrates, together with the image sensor 1A, a lens unit (the imaging lens 10, a lens holder 11, and a focusing coil 3) among components of a movable unit 20 in the second embodiment, and magnets 13 (13a, 13b, 13c, and 13d) formed in a lens unit holder 12.

The image sensor 1A is different from the image sensor 1 of the first embodiment in that the image sensor 1A includes a magnetic sensor as a coil-type sensor D2 constituted by a coil, on a side of an incident surface for light from a subject. Although not illustrated in detail, this coil-type sensor D2 is constituted by a coil formed on a surface of a semiconductor substrate is described later on a side on which light from a subject is incident.

Specifically, in the present example, the coil in the coil-type sensor D2 is disposed in an outer peripheral region of an effective pixel region. More specifically, the coil is formed in a region on an outer peripheral side of the effective pixel region and on an inner peripheral side of a pad formation region formed for performing wire bonding using the bonding wire W described above.

With the coil-type sensor D2 as described above, it is possible to detect an induced electromotive force based on a magnetic field generated by the focusing coil 3 provided so as to be displaceable together with the imaging lens 10 in a direction of the reference optical axis Ax.

Since this induced electromotive force tends to increase as the imaging lens approaches the image sensor side, a position of the imaging lens in the direction of the reference optical axis can be detected on the basis of a detection value obtained by the axial-direction magnetic sensor described above.

In FIG. 12, an image of a magnetic field generated by the focusing coil 3 is schematically represented by a dotted arrow.

Figure 13:
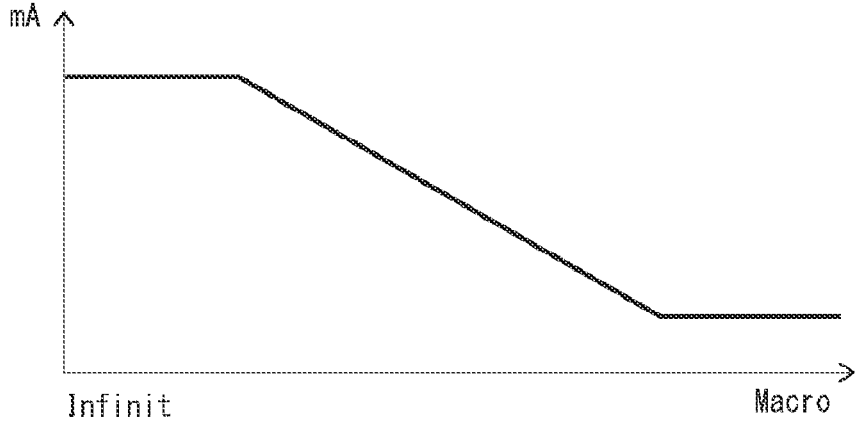
FIG. 13 is a view illustrating a relationship between focus adjustment of an imaging lens and a detection value of an axial-direction magnetic sensor.

FIG. 13 is a view illustrating a relationship between focus adjustment of the imaging lens 10 and a detection value of the coil-type sensor D2.

A horizontal axis in the figure indicates a movable range of the imaging lens 10 by focus adjustment (a movable range in the direction of the reference optical axis Ax), in which "Infinit" in the figure indicates a distance of infinity, and "Macro" indicates a minimum value of a distance to a subject in focus. Here, when the imaging lens 10 is moved to the "Infinit" side, the imaging lens 10 approaches the image sensor 1A side. Conversely, when the imaging lens 10 is moved to the "Macro" side, the imaging lens 10 moves away from the image sensor 1A.

As illustrated, a detection value of the coil-type sensor D2 has a characteristic of decreasing in response to displacement of the imaging lens 10 from the "Infinit" side to the "Macro" side in the direction of the reference optical axis Ax (that is, a detection value decreases in response to movement of the imaging lens 10 away from the image sensor 1A).

It can be seen from this FIG. 13 that a position of the imaging lens 10 in the direction of the reference optical axis Ax can be detected from a detection value of the coil-type sensor D2.

As a method for detecting a position of the imaging lens 10 in an optical axis direction, a method of providing a magnet in conjunction with displacement of the imaging lens 10 in the optical axis direction can be considered. However, according to the configuration of the second embodiment, it is possible to eliminate the necessity of disposing such a magnet, and to reduce a size and a weight of the imaging optical system.

Here, according to the image sensor 1A of the second embodiment in which the magnetic sensor D1 and the coil-type sensor D2 are provided, regarding the imaging lens 10, it is possible to perform position/orientation detection for a total of five axes of a direction (two axes) orthogonal to the reference optical axis Ax, a tilt direction (two axes), and a direction (one axis) of the reference optical axis Ax.

Figure 14:
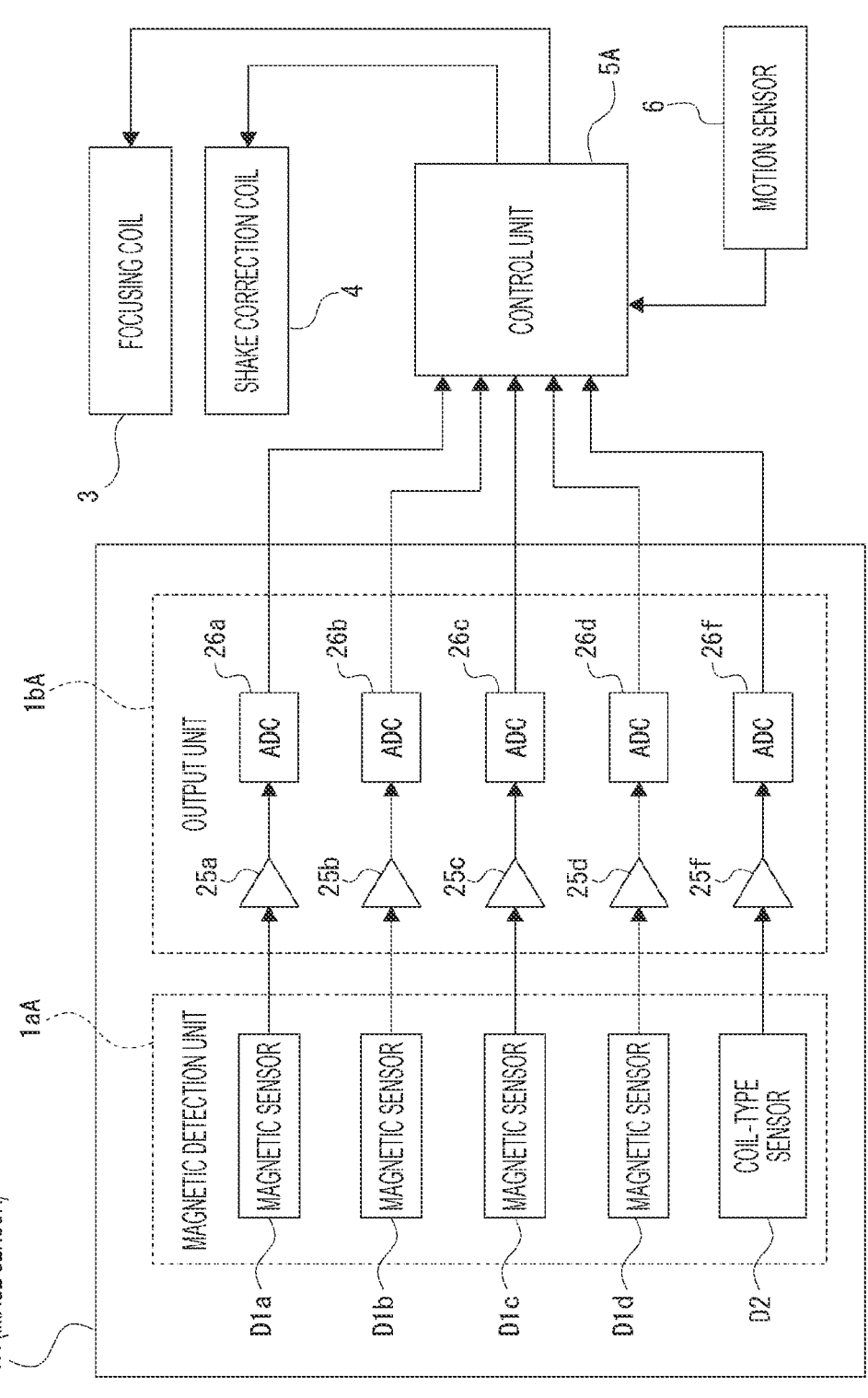
FIG. 14 is a diagram illustrating an electrical configuration example of an imaging unit corresponding to a case of performing five-axis detection.

FIG. 14 is a diagram illustrating an electrical configuration example of the imaging unit 51 corresponding to a case of performing such five-axis detection.

As illustrated, the image sensor 1A includes a magnetic detection unit 1aA having the coil-type sensor D2 together with the magnetic sensors D1a, D1b, D1c, and D1d, and an output unit 1bA having an amplifier 25f and an ADC 26f in addition to the amplifiers 25a, 25b, 25c, and 25d and the ADCs 26a, 26b, 26c, and 26d described above.

In the output unit 1bA, the amplifier 25f amplifies a detection signal obtained by the coil-type sensor D2, and the ADC 26f converts the detection signal amplified by the amplifier 25f into a digital value.

Similarly to the control unit 5 described above, a control unit 5A performs drive control of a shake correction coil 4 for optical shake correction based on a detection signal of a motion sensor 6 and drive control of the focusing coil 3 for focus adjustment.

Here, as the optical shake correction, correction involving driving of the imaging lens 10 in a tilt direction is performed. Correspondingly, the control unit 5A performs position detection and tilt angle detection in a direction orthogonal to the reference optical axis Ax of the imaging lens 10 based on outputs from the ADCs 26a, 26b, 26c, and 26d, and also performs position detection in the direction of the reference optical axis Ax of the imaging lens 10 on the basis of an output from the ADC 26f.

By detecting the tilt angle of the imaging lens 10, it is possible to perform control to prevent the imaging lens 10 from sticking to an end position of a movable range also in the tilt direction.

Furthermore, it is conceivable to use detection information regarding a position of the imaging lens 10 in the direction of the reference optical axis Ax, for driving the focusing coil 3. For example, it is conceivable to use the detection information for feedback control for causing a position of the imaging lens 10 in the direction of the reference optical axis Ax to coincide with a target position.

3. Magnetoresistive Effect Element

As described above, in the present example, the TMR sensor is used as the magnetic sensor D1, which allows the magnetic sensor D1 to be formed in a wiring layer of the image sensor 1 (or 1A) by using a semiconductor manufacturing process.

Figures 15A, 15B:
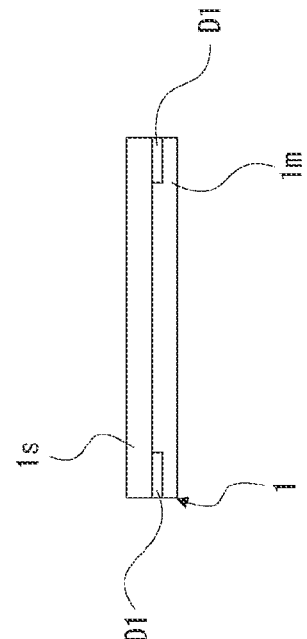
FIGS. 15A and 15B are explanatory views of a semiconductor substrate and a wiring layer included in the image sensor of the embodiment.

FIGS. 15A and 15B are explanatory views of the semiconductor substrate 1s and the wiring layer 1m included in the image sensor 1. FIG. 15A illustrates a schematic longitudinal cross-sectional structure of the image sensor 1, and FIG. 15B is a schematic exploded perspective view of the semiconductor substrate 1s and the wiring layer 1m.

The wiring layer 1m is layered on a surface of the semiconductor substrate 1s on an opposite side to an incident surface of light from a subject, and is configured by alternately layering an insulating layer and a wiring formation layer on which a wiring pattern is formed.

As illustrated, each magnetic sensor D1 is formed inside the wiring layer 1m.

Figure 16A:
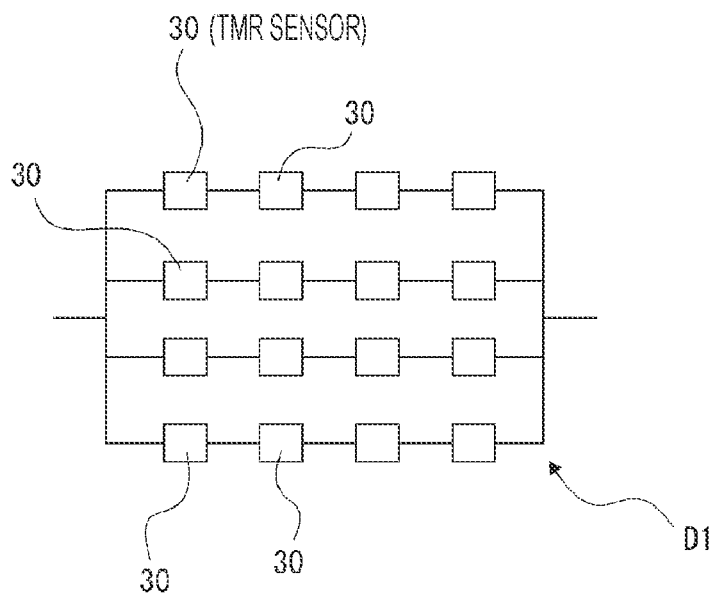
FIGS. 16A and 16B are explanatory views of a TMR sensor in the embodiment.

Here, as illustrated in a circuit diagram of FIG. 16A, the magnetic sensor D1 includes a plurality of TMR sensors 30. Specifically, the magnetic sensor D1 has a plurality of series connection circuits in which the plurality of TMR sensors 30 is connected in series, and is formed by connecting these series connection circuits in parallel.

By configuring the magnetic sensor D1 with the plurality of TMR sensors 30 (MTJ elements) in this manner, noise resistance of the magnetic sensor D1 can be enhanced.

Note that although FIG. 16A illustrates an example in which the plurality of TMR sensors 30 is disposed in a two-dimensional array, the plurality of TMR sensors 30 may be arranged one-dimensionally. In other words, it is also possible to adopt a configuration having only one of the series connection circuits described above.

Figure 16B:
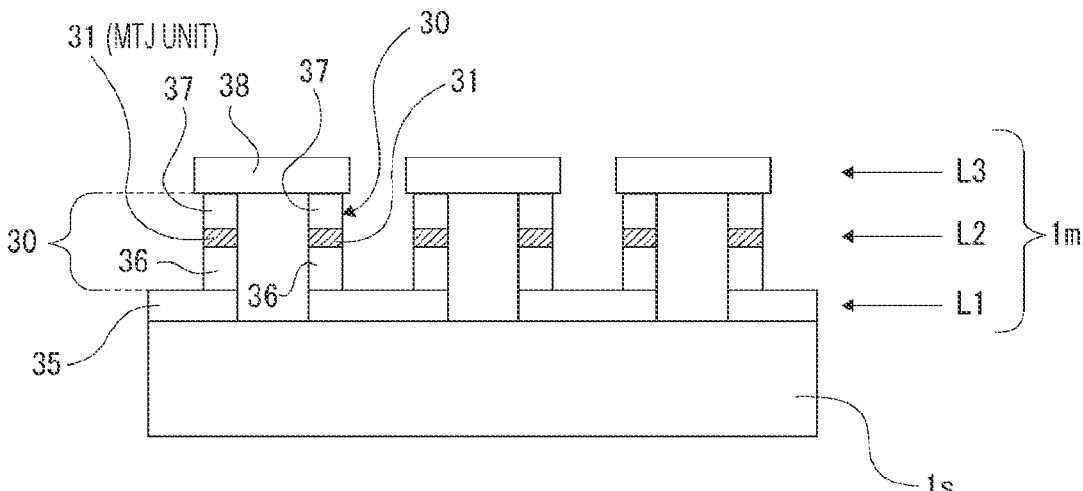

FIG. 16B is an explanatory view of a schematic longitudinal cross-sectional structure of the TMR sensor 30.

Here, a case is illustrated in which the wiring layer 1m has three wiring formation layers of a first wiring formation layer L1 to a third wiring formation layer L3.

As illustrated, the TMR sensor 30 has: a first contact 36 formed by a via penetrating between the first wiring formation layer L1 and the second wiring formation layer L2; an MTJ unit 31 formed in the second wiring formation layer L2 and electrically connected to the first contact 36; and a second contact 37 formed by a via penetrating between the second wiring formation layer L2 and the third wiring formation layer L3.

In the first wiring formation layer L1, wiring 35 electrically connected to the first contact 36 of the TMR sensor 30 is electrically connected to the first contact 36 of another TMR sensor 30.

Furthermore, in the third wiring formation layer L3, wiring 38 electrically connected to the second contact 37 of the TMR sensor 30 is electrically connected to the second contact 37 of another TMR sensor 30.

In the TMR sensor 30, the first contact 36, the MTJ unit 31, and the second contact 37 are arranged in a vertical direction as illustrated in FIG. 16B, in order to allow a current in the vertical direction to flow to the MTJ unit 31.

Figure 17:
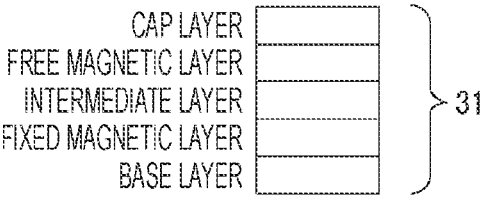
FIG. 17 is a view for explaining a structure of an MTJ unit in the embodiment.

FIG. 17 is a view for explaining a structure of the MTJ unit 31.

As illustrated, the MTJ unit 31 has a structure in which a base layer, a fixed magnetic layer, an intermediate layer, a free magnetic layer, and a cap layer are sequentially layered.

The base layer is selected so as to provide suitable crystallinity of the fixed magnetic layer and the layers above the fixed magnetic layer, and Ta, Ru, Pt, Ni, Cr, or the like, or a laminated film thereof is used.

The fixed magnetic layer is a layer in which a magnetization direction is substantially fixed with respect to an external magnetic field, and Co, Fe, CoFeB, CoFe, a Co/Pt laminated film, a Co/Ni laminated film, or the like is used.

As the fixed magnetic layer, a three-layer structure with a nonmagnetic layer interposed therebetween can be used, as illustrated in a middle part of the figure. In this fixed magnetic layer having the three-layer structure, since magnetization of a first magnetic layer and magnetization of a second magnetic layer are connected in antiparallel, not only the magnetization is more easily fixed, but also a total stray magnetic field from the fixed magnetic layer can be controlled. As the nonmagnetic layer, Ir, Ru, or the like is used.

Moreover, as illustrated in a lower part of the figure, magnetization of the fixed magnetic layer can also be firmly fixed by placing an antiferromagnetic layer to be adjacent. As the antiferromagnetic layer, PtMn, IrMn, FeMn, or the like is used.

The intermediate layer is a layer that is important for magnetically separating the free magnetic layer and the fixed magnetic layer and causing a magnetoresistive effect to appear. When a difference between magnetization directions of the free magnetic layer and the fixed magnetic layer is AO, an electrical resistance of the MTJ unit 31 is proportional to cos ($\Delta\theta$). As the intermediate layer, MgO, $Al_2O_3$, or the like that is an insulating barrier layer can be used.

The free magnetic layer is a layer whose magnetization direction changes with respect to an external magnetic field, and Co, Fe, NiFe, NiCoFe, CoFeB, CoFe, a Co/Pt laminated film, a Co/Ni laminated film, or the like is used. As the free magnetic layer, a layer obtained by layering a magnetic body such as CoFeB/Mo/CoFeB and a nonmagnetic body can also be used.

The cap layer is a layer provided for preventing diffusion from an upper via or electrode and simultaneously controlling crystallinity of the free magnetic layer. As the cap layer, MgO, Ru, Pt, W, or the like is used.

FIGS. 18A, 18B, 18C, 18D, 18E, and 18F illustrate examples of a process of forming the TMR sensor 30 having the MTJ unit 31.

Figure 18A:
FIGS. 18A, 18B, 18C, 18D, 18E, and 18F are views illustrating an example of a process of forming the TMR sensor in the embodiment.

First, the first contact 36 containing, for example, W is formed on the wiring 35 in the first wiring formation layer L1, and planarized by chemical mechanical planarization (CMP) (FIG. 18A).

Figure 18B:
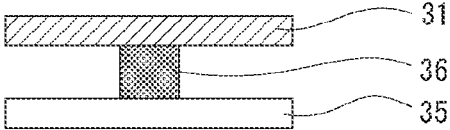

Next, in the second wiring formation layer L2, the base layer, the fixed magnetic layer, the intermediate layer, the free magnetic layer, and the cap layer described above are sequentially deposited by a sputtering method, to form an MTJ film 31' (FIG. 18B). As the MTJ film 31', for example, Ta/Ru/CoFeB/Ru/CoFeB/MgO/CoFeB/Ru is used.

Figure 18C:
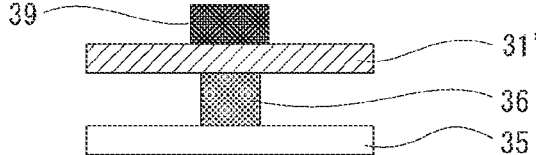

Next, a hard mask 39 containing, for example, Ta/SiO₂ is deposited by plasma chemical vapor deposition (CVD), and processed into a desired shape by plasma etching (FIG. 18C).

Figure 18D:
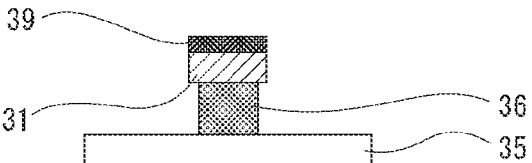

The MTJ film 31' is processed into a desired shape by ion milling, and the MTJ unit 31 is formed (FIG. 18D).

Figure 18E:
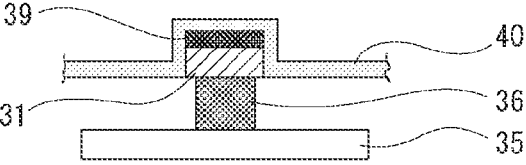
Figure 18F:
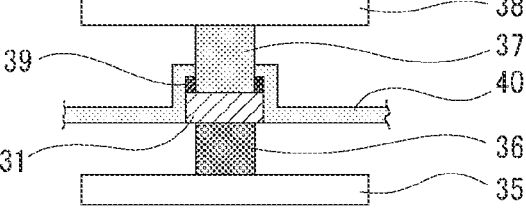

Moreover, a protective film 40 containing, for example, SiN is formed by plasma CVD (FIG. 18E). Finally, the second contact 37 containing, for example, Cu is formed by a punching process, and is electrically connected to the wiring 38 of the third wiring formation layer L3 (FIG. 18F).

Here, as the intermediate layer illustrated in FIG. 17, a metal layer can be used instead of the insulating barrier layer. In this case, providing the magnetoresistance is based not on the TMR effect but on the giant magnetic resistance (GMR) effect. Therefore, in a case where the intermediate layer is a metal layer, the magnetoresistive effect element is generally referred to as a GMR element (hereinafter, referred to as a GMR element 32). At this time, examples of the metal layer used for the intermediate layer include a layer containing Cu, Au, or the like.

In the case of the GMR element 32, since the intermediate layer is metal, the resistance in a case where a current flows in a direction perpendicular to the film is excessively small. Therefore, it is desirable to adopt a structure in which a current flows in a direction parallel to the film surface.

FIG. 19 is an explanatory view of a formation example of the GMR element 32.

As illustrated, the GMR element 32 is formed in the second wiring formation layer L2 so as to connect between two first contacts 36 formed between the first wiring formation layer L1 and the second wiring formation layer L2. As a result, in the GMR element 32, a current flowing from the wiring 35 via the first contact 36 can flow in a direction parallel to a film surface.

Here, magnetization directions of the free magnetic layer and the fixed magnetic layer are determined on the basis of a direction of magnetic anisotropy of each magnetic layer and an external magnetic field. As the magnetic anisotropy, there are perpendicular magnetic anisotropy (see FIG. 20A) in which magnetization tends to be directed in a direction perpendicular to the film, and in-plane magnetic anisotropy (see FIG. 20B) in which magnetization tends to be directed in a film plane. In the present technology, a magnetic layer having any magnetic anisotropy can be used.

Hereinafter, a description is given to the fact that a position of the imaging lens 10 in a direction orthogonal to the reference optical axis Ax can be detected by the TMR sensor 30 having the MTJ unit 31, by using a case as an example in which the free magnetic layer has relatively weak in-plane magnetic anisotropy (that is, a property in which magnetization is easily directed also in the perpendicular direction to some extent), and the fixed magnetic layer has perpendicular magnetic anisotropy.

Figure 21:
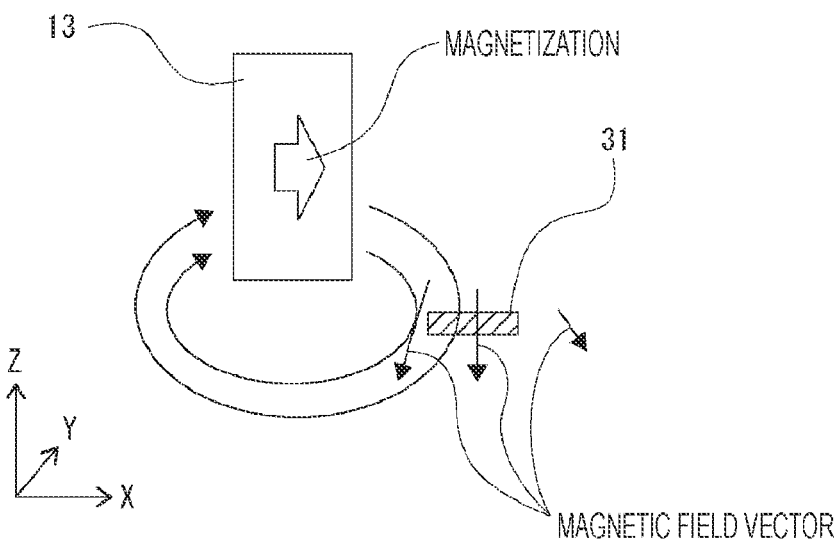
FIG. 21 is an explanatory view of a magnetic field generated from a magnet.

FIG. 21 is an explanatory view of a magnetic field generated from the magnet 13.

FIG. 21 illustrates a positional relationship between the magnet 13 and the MTJ unit 31, and schematically illustrates a magnetization direction in the magnet 13 and an image of a magnetic field generated from the magnet 13, and a magnetic field vector for the magnetic field acting on the MTJ unit 31.

Here, an X-axis direction and a Y-axis direction in the figure are the same as the X-axis direction and the Y-axis direction described in FIG. 5 and the like. A Z-axis direction is a direction of the reference optical axis Ax.

According to this FIG. 21, it can be seen that a magnetic field component (hereinafter, also referred to as a Z component of the magnetic field) in the Z-axis direction is dominant in the magnetic field acting on the MTJ unit 31 from the magnet 13.

Figure 22:
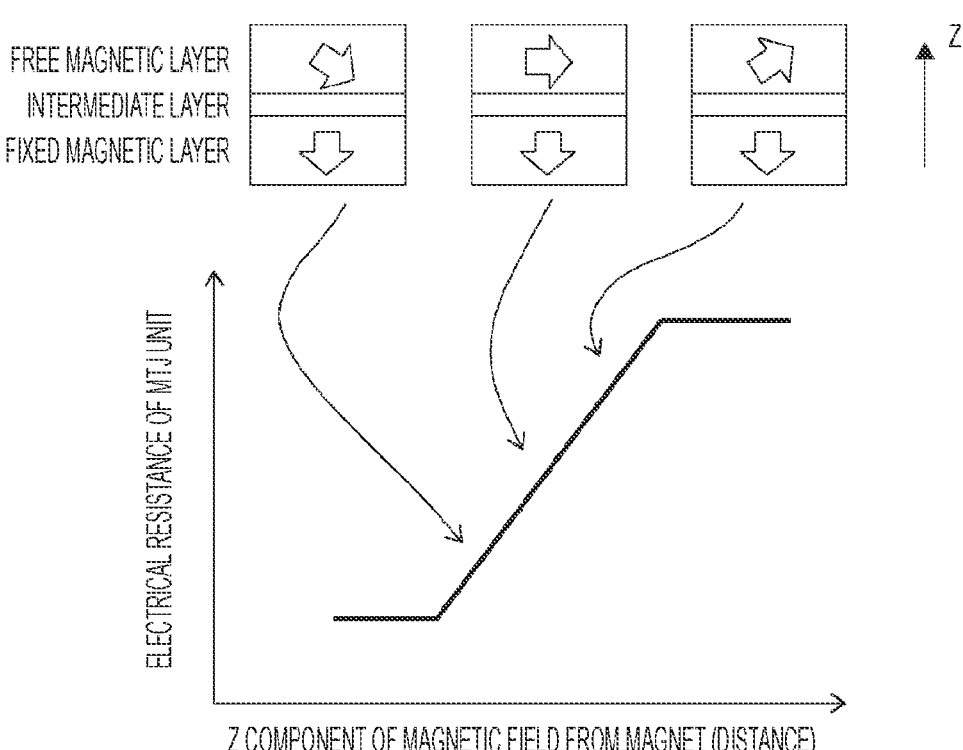
FIG. 22 is a view illustrating an example of a change mode of a magnetization state of the MTJ unit and a change characteristic of electric resistance of the MTJ unit, with respect to a change in distance between the MTJ unit and a magnet.

FIG. 22 illustrates an example of a change mode of a magnetization state of the MTJ unit 31 and a change characteristic of an electric resistance of the MTJ unit 31, with respect to a change in distance between the MTJ unit 31 and the magnet 13.

In a state where the distance between the MTJ unit 31 and the magnet 13 is long, the Z component (a negative direction) of the magnetic field acting on the MTJ unit 31 from the magnet 13 is small. Therefore, a magnetization direction in the free magnetic layer is more inclined to a side in a direction opposite to magnetization of the fixed magnetic layer than a direction parallel to the plane. When the Z component of the magnetic field increases as the distance between the MTJ unit 31 and the magnet 13 becomes shorter, the magnetization direction in the free magnetic layer is brought into a state of being parallel to the plane and then inclined in the same direction as the magnetization of the fixed magnetic layer.

As a result, as the distance between the MTJ unit 31 and the magnet 13 becomes shorter, that is, as the component of the magnetic field acting on the MTJ unit 31 in the Z direction becomes larger, a current more easily flows in the MTJ unit 31, in other words, the electrical resistance becomes smaller.

Therefore, in the MTJ unit 31, magnitude of the electric resistance changes in response to a change in distance to the magnet 13, and a position of the imaging lens 10 in a direction orthogonal to the reference optical axis Ax can be detected by detecting such a change in electric resistance of the MTJ unit 31 as a change in voltage or a change in current.

Note that a change direction of the electric resistance of the MTJ unit 31 with respect to a distance to the magnet 13 can be reversed by reversing the magnetization direction of the fixed magnetic layer.

Figure 23:
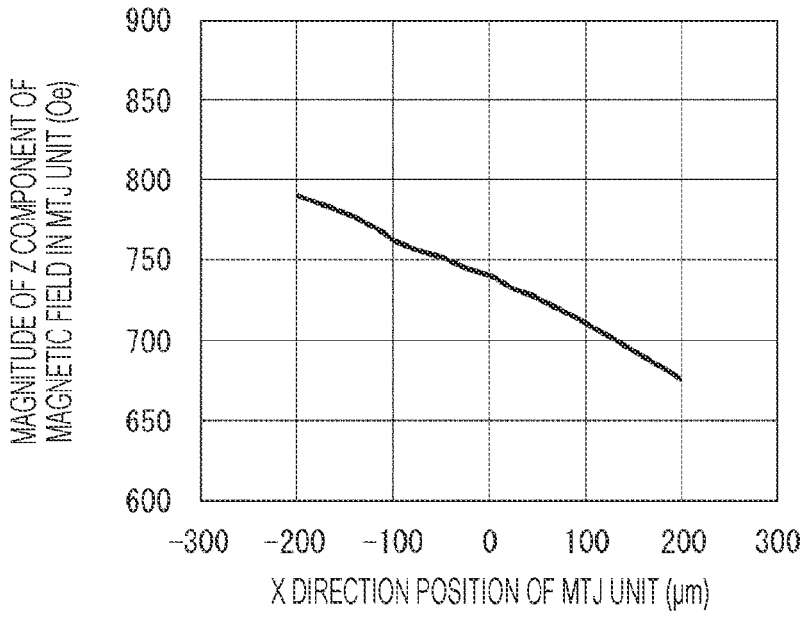
FIG. 23 is a graph illustrating a change characteristic of a Z component of a magnetic field in the MTJ unit and a change characteristic of a read voltage of the MTJ unit when the MTJ unit is displaced in the X-axis direction.
Figure 23:
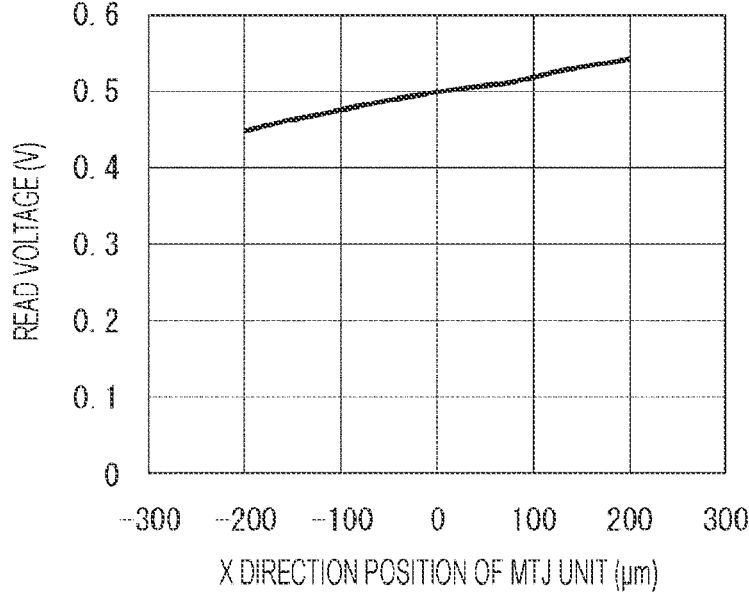

For reference, FIG. 23 illustrates a change characteristic of the Z component of the magnetic field in the MTJ unit 31 and a change characteristic of a read voltage of the MTJ unit 31, when the MTJ unit 31 is displaced in the X-axis direction.

Note that, although an example has been described above in which the MTJ unit 31 detects a change of the Z component of the magnetic field, a configuration may be adopted, as a modification, in which the MTJ unit 31 detects a change of the X component (a magnetic field component in the X-axis direction) of the magnetic field.

In that case, the MTJ unit 31 is configured such that the free magnetic layer has magnetic anisotropy in the plane (the Y-axis direction), and the fixed magnetic layer has in-plane magnetic anisotropy in the X-axis direction (that is, magnetization is fixed in the X-axis direction). At this time, the free magnetic layer is configured such that magnetization is not directed in a direction perpendicular to the plane.

Figure 24:
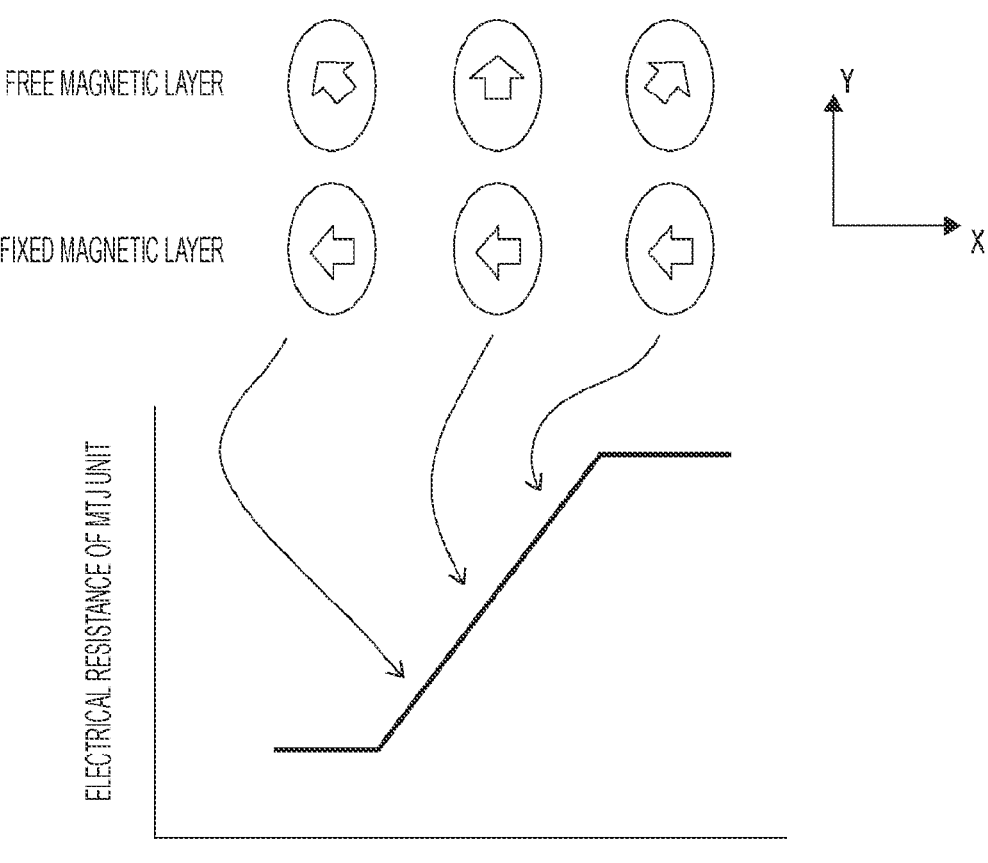
FIG. 24 is a view illustrating an example of a change mode of a magnetization state of an MTJ unit and a change characteristic of electric resistance of the MTJ unit with respect to a change in distance between the MTJ unit and a magnet, in a case where the MTJ unit as a modification is used.

FIG. 24 illustrates an example of a change mode of a magnetization state of the MTJ unit 31 and a change characteristic of an electric resistance of the MTJ unit 31 with respect to a change in distance between the MTJ unit 31 and the magnet 13, in a case where the MTJ unit 31 as the modification described above is used.

In a state where the distance between the MTJ unit 31 and the magnet 13 is long, the X component of the magnetic field acting on the MTJ unit 31 from the magnet 13 is in a positive direction. Therefore, a magnetization direction in the free magnetic layer is a direction in antiparallel to a magnetization direction of the fixed magnetic layer (in this case, parallel to the X-axis direction) and inclined to the Y-axis direction side. When the X component of the magnetic field acting on the MTJ unit 31 increases in the negative direction as the distance between the MTJ unit 31 and the magnet 13 becomes shorter, the magnetization direction in the free magnetic layer is brought into a state of being parallel to the Y axis and then inclined to the same side as the magnetization direction of the fixed magnetic layer.

As a result, as the distance between the MTJ unit 31 and the magnet 13 becomes shorter, a current more easily flows in the MTJ unit 31, in other words, the electrical resistance becomes smaller.

Therefore, also in the MTJ unit 31 in this case, magnitude of the electric resistance changes in response to a change in distance to the magnet 13, and a position of the imaging lens 10 in a direction orthogonal to the reference optical axis Ax can be detected by detecting such a change in electric resistance of the MTJ unit 31 as a change in voltage or a change in current.

Figure 25:
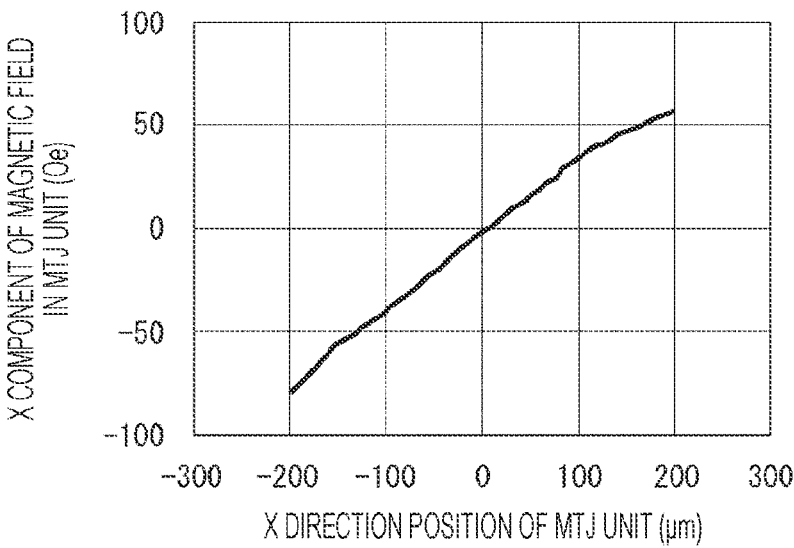
FIG. 25 is a graph illustrating a change characteristic of an X component of a magnetic field in the MTJ unit and a change characteristic of a read voltage of the MTJ unit when the MTJ unit as the modification is displaced in the X-axis direction.
Figure 25:
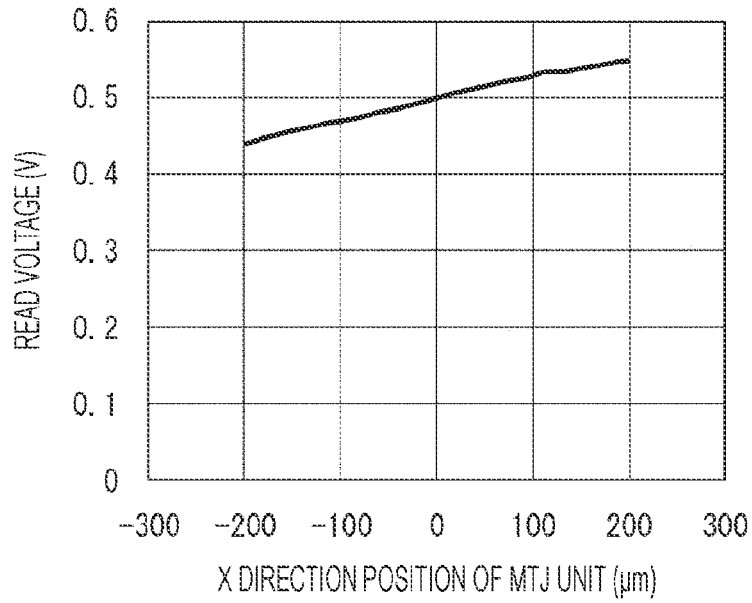

Note that FIG. 25 illustrates a change characteristic of the X component of the magnetic field in the MTJ unit 31 and a change characteristic of a read voltage of the MTJ unit 31, when the MTJ unit 31 as the modification described above is displaced in the X-axis direction.

As can be seen with reference to FIG. 21 above, since the X component of the magnetic field is not dominant in the magnetic field acting on the MTJ unit 31 from the magnet 13, a value of a vertical axis is smaller for the characteristic of the X component in FIG. 25 than that for the characteristic of the Z component in FIG. 23.

Figure 26:
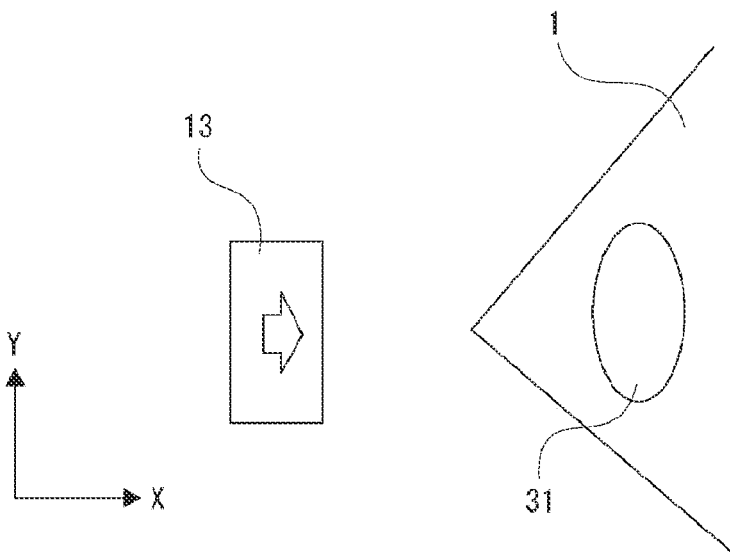
FIG. 26 is a view illustrating an example of a shape of a free magnetic layer in the MTJ unit.

Here, as illustrated in FIG. 26, a shape of the free magnetic layer in the MTJ unit 31 can be made an ellipse. Making the ellipse causes shape magnetic anisotropy to be induced in a major axis direction. An aspect ratio of the ellipse is desirably about 1.5 to 3.0. In a case where the aspect ratio is small, a magnetic domain is likely to occur, and in a case where the aspect ratio is large, there is a problem that an area becomes large.

In a case where a change in the magnetic field in the vertical (Z-axis) direction is detected, a direction of a long axis can be set regardless of a direction of the magnet 13.

Furthermore, even if the shape of the free magnetic layer is not the ellipse but a perfect circle, an operation is not hindered except that a risk of occurrence of a magnetic domain increases.

Squares and rectangles are not desirable because magnetization directions at end portions are to be non-uniform.

Shapes of the barrier layer and the fixed magnetic layer of the MTJ unit 31 may be the same as that of the free magnetic layer or may be any shape one size larger.

Figure 27:
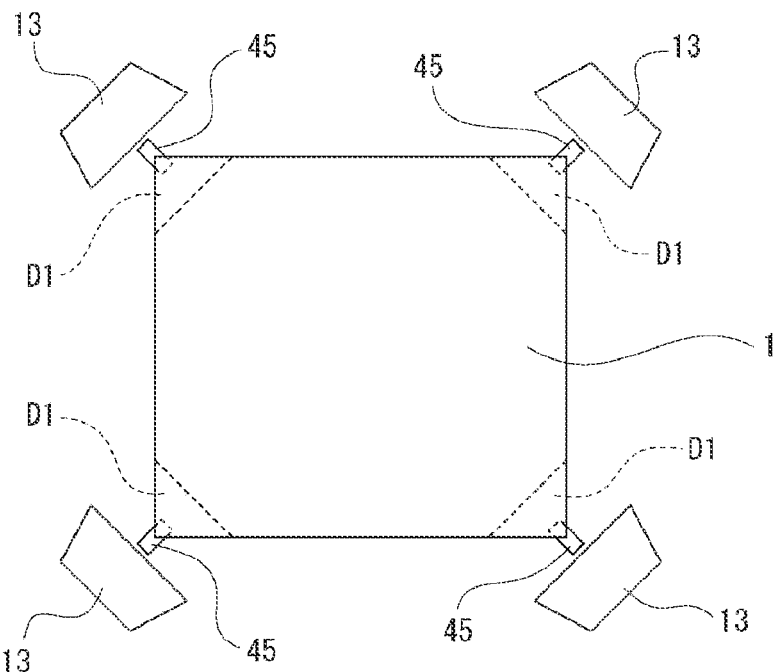
FIG. 27 is an explanatory view of an example in which a soft magnetic body is provided for every magnetic sensor.

Furthermore, as illustrated in FIG. 27, a soft magnetic body 45 (a yoke) may be provided for the magnetic sensor D1.

Specifically, the soft magnetic body 45 is provided for each of the plurality of magnetic sensors D1 formed in the image sensor 1. The soft magnetic body 45 may be provided on the light incident surface side in the image sensor 1, or may be provided on a side opposite to the incident surface.

It is conceivable to use permalloy, for example, as the soft magnetic body 45.

By providing the soft magnetic body 45 for every magnetic sensor D1 as described above, magnetic flux from the individually corresponding magnet 13 can easily flow in each magnetic sensor, and sensitivity of the magnetic sensor D1 can be improved.

Note that, in the above description, an example has been described in which the magnetic sensor D1 including the TMR sensor 30 (the MTJ element) or the GMR element 32 is formed in the wiring layer 1*m*, but it is not essential to form these in the wiring layer 1*m*. For example, in a case where the image sensor 1 adopts a configuration in which another semiconductor chip is bonded on a side opposite to a surface of the wiring layer 1*m* on a side in contact with the semiconductor substrate 1s, for example, it is conceivable to form the magnetic sensor D1 including the TMR sensor 30 or the GMR element 32 in the another semiconductor chip.

4. Modification

Here, the embodiment is not limited to the specific example described above, and configurations as various modifications can be adopted.

Figure 28A:
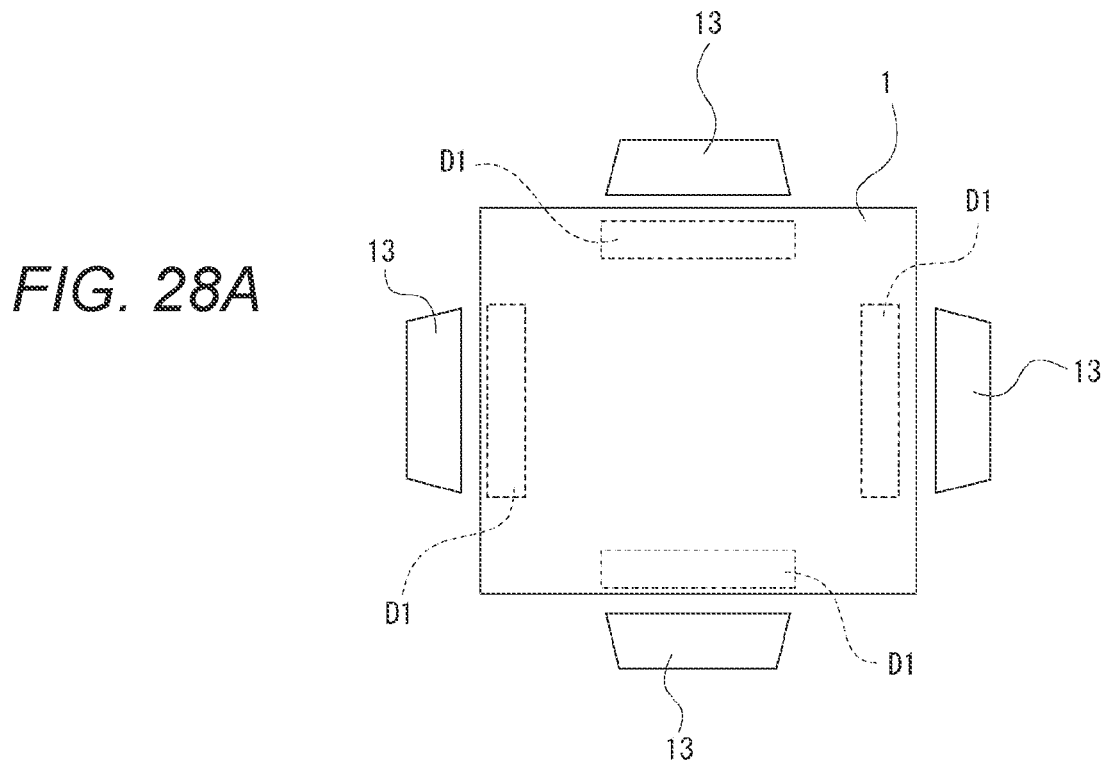
FIGS. 28A and 28B are explanatory views of a modification regarding arrangement of the magnetic sensor.
Figure 28B:
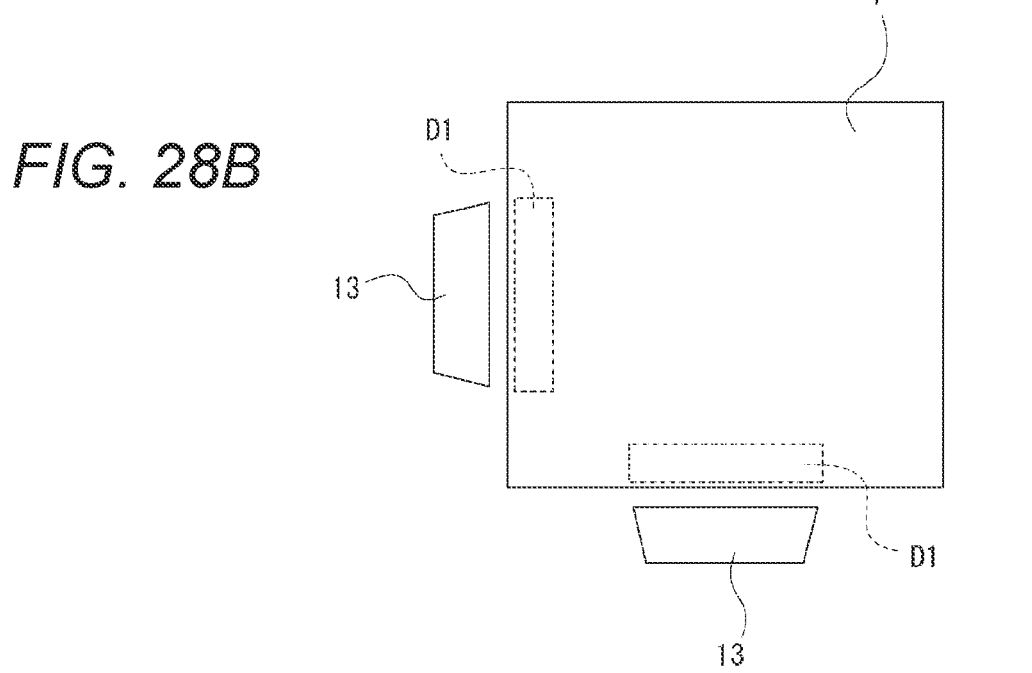

For example, in the above description, an example has been described in which the magnetic sensors D1 are provided at the four corner positions of the image sensor 1, but examples illustrated in FIGS. 28A and 28B are considerable as the arrangement position of the magnetic sensors D1, for example.

FIG. 28A illustrates an example in which the magnetic sensor D1 is disposed at a substantially center of each side portion in the image sensor 1.

Furthermore, FIG. 28B illustrates an example in which only two of the four magnetic sensors D1 in the example of FIG. 28A are provided. Specifically, in the example of FIG. 28A, only one of the magnetic sensors D1 individually formed on two sides in the column direction and only one of the magnetic sensors D1 individually formed on two sides in the row direction are included.

This arrangement makes it possible to detect a position of the imaging lens 10 in any direction orthogonal to the reference optical axis Ax, similarly to the example of FIG. 8 above.

Note that the example illustrated in FIG. 28A satisfies the condition that enables tilt detection described above. That is, it can be expressed that the magnetic detection unit 1a in this case has: two magnetic sensors D1 positioned to face each other at both end portions in the row direction of the image sensor 1; and two orthogonal-direction magnetic sensors positioned to face each other at both end portions in the column direction of the image sensor 1.

Figure 29:
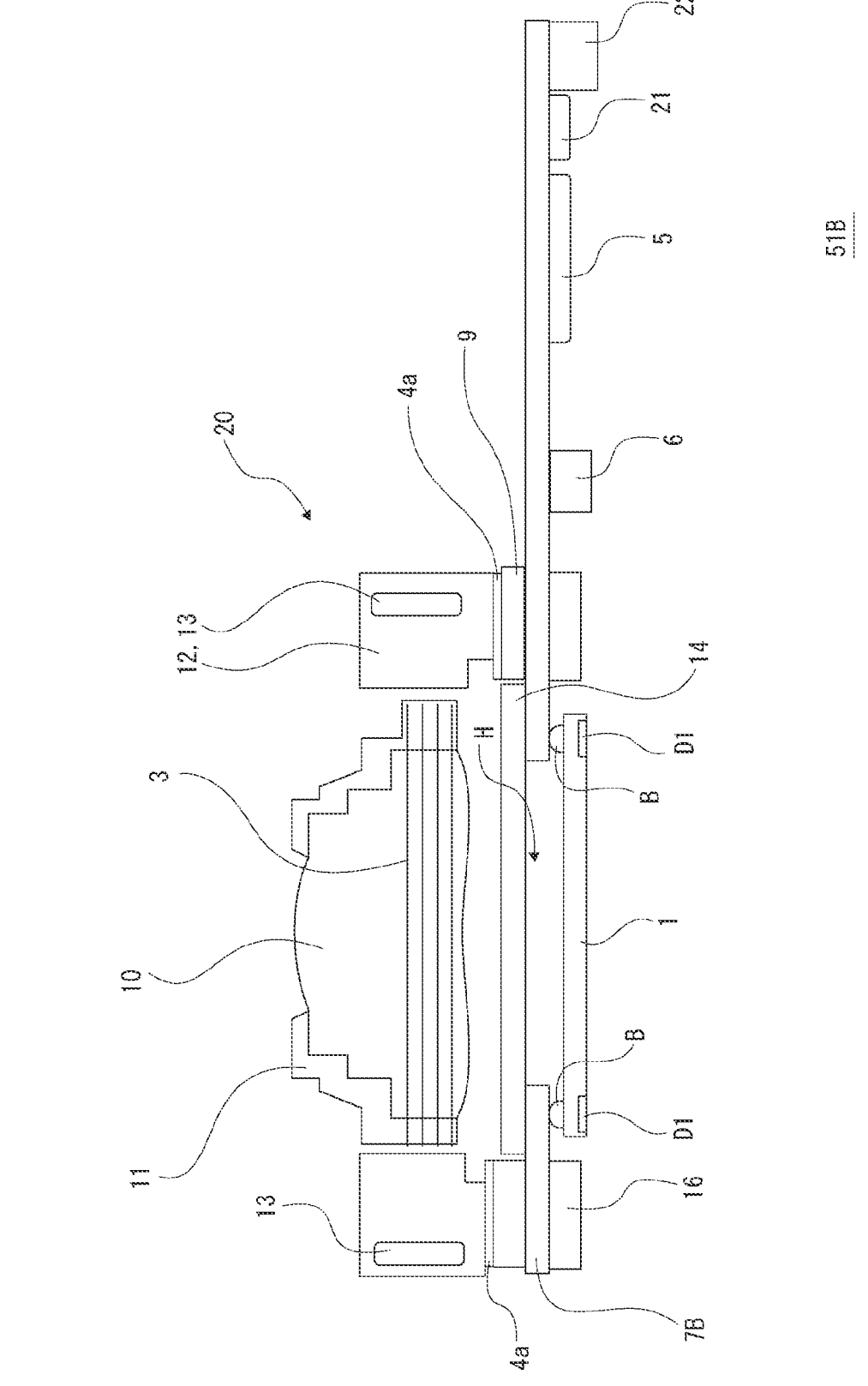
FIG. 29 is an explanatory view of a modification regarding a connection mode of the image sensor with respect to a wiring substrate.

Furthermore, in the above description, an example has been described in which the image sensor 1 is connected to the wiring substrate 7 by wire bonding, as the imaging unit 51. However, as in an imaging unit 51B illustrated in FIG. 29, the image sensor 1 may be bump-connected to a wiring substrate 7B.

In this case, as the wiring substrate 7B, one is used in which an opening portion H is formed at a position where light from the imaging lens 10 is incident. The image sensor 1 in this case is disposed below the opening portion H such that light is incident on an effective pixel region through this opening portion H, and is electrically connected to a lower surface side of the wiring substrate 7B by a bump B such as, for example, solder formed on the light incident surface side.

On the lower surface side of the wiring substrate 7B, a protective member 16 that covers a side of the image sensor 1 is provided. Furthermore, in the wiring substrate 7B in this case, the motion sensor 6, the control unit 5, the memory unit 21, and the connector unit 22 described above are formed on the lower surface side.

Furthermore, in the above description, an example has been described in which optical shake correction is performed by moving the imaging lens 10, but the present technology can also be suitably applied to a case where optical shake correction is performed by moving the image sensor 1 side. In this case, a target of position detection performed on the basis of a detection value of the magnetic sensor D1 is not the imaging lens 10 but the image sensor 1.

Furthermore, in the above description, an example has been described in which the image sensor and the imaging device according to the present technology are applied to a mobile information processing apparatus such as a smartphone, but the present technology can be widely and suitably applied to an apparatus including an imaging function.

5. Summary of Embodiment

As described above, the image sensor (the same 1 or 1A) according to the embodiment includes: the semiconductor substrate (the same 1s) in which a plurality of pixels each having a photoelectric conversion element is two-dimensionally arranged; and the magnetic detection unit (the same 1a, 1aA) configured to detect a magnetic change according to a change in a relative position with respect to the imaging lens (the same 10) that guides light from a subject to the pixels.

According to the configuration described above, the magnetic detection unit is provided in the image sensor.

As a result, it is possible to suppress an increase in size of the imaging unit due to provision of the magnetic detection unit.

Furthermore, in the image sensor according to the embodiment, the magnetic detection unit has the orthogonal-direction magnetic sensor (the magnetic sensor D1) that detects a magnetic change according to a change in the relative position in a direction orthogonal to the reference optical axis (the same Ax) of the imaging optical system including the imaging lens.

The orthogonal-direction magnetic sensor as described above makes it possible to detect a position, which changes in accordance with the optical shake correction, of the imaging lens or the image sensor in a reference optical axis orthogonal direction.

Therefore, in a case where optical shake correction of displacing the imaging lens or the image sensor in the reference optical axis orthogonal direction is performed, it is possible to perform control to prevent the imaging lens or the image sensor from sticking to an end position of a movable range of the optical shake correction, on the basis of a detection value of the orthogonal-direction magnetic sensor.

Moreover, in the image sensor according to the embodiment, as the orthogonal-direction magnetic sensor, the magnetic detection unit has: the first direction magnetic sensor in which a change amount of a detection value according to a change in the relative position in a first direction which is a predetermined direction among directions orthogonal to the reference optical axis is larger than a change amount of a detection value according to a change in the relative position in a second direction which is a direction orthogonal to the reference optical axis and is a direction orthogonal to the first direction; and the second direction magnetic sensor in which a change amount of a detection value according to a change in the relative position in the second direction is larger than a change amount of a detection value according to a change in the relative position in the first direction.

The first direction magnetic sensor described above can detect a position of the imaging lens or the image sensor in the first direction, and the second direction magnetic sensor described above can detect a position of the imaging lens or the image sensor in the second direction. Therefore, on the basis of detection values of the first and second direction magnetic sensors, a position in any direction orthogonal to the reference optical axis can be detected as a position of the imaging lens or the image sensor.

Therefore, in a case of performing optical shake correction of displacing the imaging lens or the image sensor in any direction orthogonal to the reference optical axis, it is possible to perform control to prevent the imaging lens or the image sensor from sticking to an end position of a movable range of the optical shake correction, on the basis of a detection value of the orthogonal-direction magnetic sensor.

Moreover, in the image sensor according to the embodiment, the magnetic detection unit has: two orthogonal-direction magnetic sensors positioned to face each other at both end portions in the row direction of the image sensor; and two orthogonal-direction magnetic sensors positioned to face each other at both end portions in the column direction of the image sensor.

As described above, by the two orthogonal-direction magnetic sensors positioned to face each other at both end portions in the row direction, an inclination angle in the first tilt direction can be detected when the imaging lens or the image sensor is inclined in the first tilt direction. Furthermore, by the two orthogonal-direction magnetic sensors positioned to face each other at both end portions in the column direction, a tilt angle in the second tilt direction can be detected when the imaging lens or the image sensor is tilted in the second tilt direction orthogonal to the first tilt direction.

Therefore, it is also possible to enable detection of a position and a tilt angle of the imaging lens or the image sensor in a direction orthogonal to the reference optical axis in a case where optical shake correction by inclining in any tilt direction is performed, in addition to displacing the imaging lens or the image sensor in any direction orthogonal to the reference optical axis.

Furthermore, in the image sensor according to the embodiment, the magnetic detection unit has the orthogonal-direction magnetic sensor, individually at four corner positions in the image sensor.

As a result, in a case where optical shake correction is performed by moving the imaging lens, a position of the imaging lens in a direction orthogonal to the reference optical axis and a tilt angle can be detected in correspondence to a case where the magnets are provided at the four corner positions of the lens holding portion that moves together with the imaging lens.

Moreover, in the image sensor according to the embodiment, the magnetic detection unit has the orthogonal-direction magnetic sensor individually at a substantially center of each side portion in the image sensor.

As a result, in a case where optical shake correction is performed by moving the imaging lens, a position of the imaging lens in a direction orthogonal to the reference optical axis and a tilt angle can be detected in correspondence to a case where the magnet is provided at a substantially center of each side portion of the lens holding portion that moves together with the imaging lens.

Furthermore, in the image sensor according to the embodiment, the wiring layer (the same $1m$) is formed on a surface side opposite to the light receiving surface of the semiconductor substrate, and the orthogonal-direction magnetic sensor is formed in the wiring layer.

This configuration makes it possible to form the orthogonal-direction magnetic sensor in a process of forming the wiring layer on the semiconductor substrate.

Since the orthogonal-direction magnetic sensor can be formed by using the process of forming the wiring and the via on the wiring layer, a cost related to the formation of the orthogonal-direction magnetic sensor can be reduced.

Furthermore, in the image sensor according to the embodiment, the magnetic detection unit ($1aA$) has the axial-direction magnetic sensor (the coil-type sensor D2) constituted by a coil formed on a surface of the semiconductor substrate on a side on which light from a subject is incident.

As described above, the axial-direction magnetic sensor as the coil provided on the image sensor can detect an induced electromotive force based on a magnetic field generated from the focus coil provided to be displaceable together with the imaging lens in the direction of the reference optical axis.

Since this induced electromotive force tends to increase as the imaging lens approaches the image sensor side, a position of the imaging lens in the direction of the reference optical axis can be detected on the basis of a detection value obtained by the axial-direction magnetic sensor described above.

As a method for detecting an axial position of the imaging lens, a method of providing a magnet in conjunction with axial displacement of the imaging lens is also conceivable. However, according to the configuration described above, it is possible to eliminate the necessity of disposing such a magnet, and to reduce a size and a weight of the imaging optical system.

Furthermore, by combining with the orthogonal-direction magnetic sensor, it is possible to perform position/orientation detection for a total of five axes of a direction (two axes) orthogonal to the reference optical axis, a tilt direction (two axes), and an axial direction (one axis) of the reference optical axis.

Moreover, in the image sensor of the embodiment, the coil in the axial-direction magnetic sensor is disposed in an outer peripheral region of an effective pixel region.

In the outer peripheral region of the effective pixel region, in general, a dead space as a keep-out zone is present.

According to the configuration described above, it is possible to form the coil as the axial-direction magnetic sensor in such a keep-out zone, and it is possible to prevent a plane-direction size of the image sensor from being enlarged due to the formation of the axial-direction magnetic sensor.

Furthermore, in the image sensor according to the embodiment, the orthogonal-direction magnetic sensor has the MTJ element (the MTJ unit 31) as the magnetoresistive effect element.

The MTJ element has a large change in electric resistance value due to the magnetoresistive effect as compared with a conventional magnetoresistive effect element or the like as represented by a Hall element, and the MTJ element can improve accuracy of magnetic detection.

Furthermore, the MTJ element can be generated by a semiconductor manufacturing process, and a size of the magnetic sensor can be reduced.

Furthermore, in the image sensor according to the embodiment, the orthogonal-direction magnetic sensor includes a plurality of MTJ elements.

This configuration makes it possible to enhance noise resistance of the orthogonal-direction magnetic sensor.

Therefore, accuracy of magnetic detection by the orthogonal-direction magnetic sensor can be improved.

Moreover, in the image sensor according to the embodiment, the orthogonal-direction magnetic sensor has the GMR element (the same 32) as the magnetoresistive effect element.

The GMR element has a large change in electric resistance value due to the magnetoresistive effect as compared with a conventional magnetoresistive effect element or the like as represented by a Hall element, and the GMR element can improve accuracy of magnetic detection.

Furthermore, the GMR element can be generated by a semiconductor manufacturing process, and a size of the magnetic sensor can be reduced.

Furthermore, in the image sensor according to the embodiment, the magnetic detection unit has a plurality of orthogonal-direction magnetic sensors, and includes the soft magnetic body (the same 45) provided for every orthogonal-direction magnetic sensor.

The soft magnetic body provided for every orthogonal-direction magnetic sensor makes it possible to facilitate a flow of magnetic flux from the magnet provided for position detection of the imaging lens or the image sensor, in each of the orthogonal-direction magnetic sensors.

Therefore, sensitivity of the orthogonal-direction magnetic sensor can be improved, and detection accuracy of the relative position with respect to the imaging lens can be improved.

Furthermore, the imaging device (the same 50) as the embodiment includes: the image sensor having the semiconductor substrate in which a plurality of pixels each having the photoelectric conversion element is two-dimensionally arranged, and the magnetic detection unit configured to detect a magnetic change according to a change in a relative position with respect to the imaging lens that guides light from a subject to the pixels; and the image signal processing unit (the same 52) configured to perform signal processing on a captured image signal obtained by the image sensor.

Such an imaging device also makes it possible to obtain actions and effects similar to those of the image sensor as the embodiment described above.

Note that the effects described in this specification are merely examples and are not limited, and additional effects may be present.

6. Present Technology

Note that the present technology can also have the following configurations.

(1)
An image sensor including:
a semiconductor substrate in which a plurality of pixels each having a photoelectric conversion element is two-dimensionally arranged; and
a magnetic detection unit configured to detect a magnetic change according to a change in a relative position with respect to an imaging lens that guides light from a subject to the pixels.

(2)
The image sensor according to (1) above, in which
the magnetic detection unit has
an orthogonal-direction magnetic sensor configured to detect a magnetic change according to a change in the relative position in a direction orthogonal to a reference optical axis of an imaging optical system including the imaging lens.

(3)
The image sensor according to (2) above, in which
as the orthogonal-direction magnetic sensor, the magnetic detection unit has:
a first direction magnetic sensor in which a change amount of a detection value according to a change in the relative position in a first direction, the first direction being a predetermined direction among directions orthogonal to the reference optical axis, is larger than a change amount of a detection value according to a change in the relative position in a second direction, the second direction being a direction orthogonal to the reference optical axis and being a direction orthogonal to the first direction; and
a second direction magnetic sensor in which a change amount of a detection value according to a change in the relative position in the second direction is larger than a change amount of a detection value according to a change in the relative position in the first direction.

(4)
The image sensor according to (2) or (3) above, in which the magnetic detection unit has:
two pieces of the orthogonal-direction magnetic sensor positioned to face each other at both end portions in a row direction of the image sensor; and two pieces of the orthogonal-direction magnetic sensor positioned to face each other at both end portions in a column direction of the image sensor.

(5)
The image sensor according to (4) above, in which
the magnetic detection unit has
the orthogonal-direction magnetic sensor individually at four corner positions of the image sensor.

(6)
The image sensor according to (4) above, in which
the magnetic detection unit has
the orthogonal-direction magnetic sensor individually at a substantially center of each side portion of the image sensor.

(7)
The image sensor according to any one of (2) to (6) above, in which
a wiring layer is formed on a surface side opposite to a light receiving surface of the semiconductor substrate, and
the orthogonal-direction magnetic sensor is formed in the wiring layer.

(8)
The image sensor according to any one of (1) to (7) above, in which
the magnetic detection unit has
an axial-direction magnetic sensor constituted by a coil formed on a surface of the semiconductor substrate on a side on which light from the subject is incident.

(9)
The image sensor according to (8) above, in which
the coil in the axial-direction magnetic sensor is disposed in an outer peripheral region of an effective pixel region.

(10)
The image sensor according to any one of (2) to (7) above, in which
the orthogonal-direction magnetic sensor has an MTJ element as a magnetoresistive effect element.

(11)
The image sensor according to (10) above, in which
the orthogonal-direction magnetic sensor includes a plurality of the MTJ elements.

(12)
The image sensor according to any one of (2) to (7) above, in which
the orthogonal-direction magnetic sensor has a GMR element as a magnetoresistive effect element.

(13)

The image sensor according to any one of (2) to (7) and (10) to (12), in which the magnetic detection unit has a plurality of the orthogonal-direction magnetic sensors, and the magnetic detection unit includes a soft magnetic body provided for each of the orthogonal-direction magnetic sensors.

(14)

An imaging device including:

an image sensor having a semiconductor substrate in which a plurality of pixels each having a photoelectric conversion element is two-dimensionally arranged, and a magnetic detection unit configured to detect a magnetic change according to a change in a relative position with respect to an imaging lens that guides light from a subject to the pixels; and an image signal processing unit configured to perform signal processing on a captured image signal obtained by the image sensor.

REFERENCE SIGNS LIST

50 Imaging device
51, 51B Imaging unit
52 Image signal processing unit
1, 1A Image sensor
1a, 1aA Magnetic detection unit
1s Semiconductor substrate
1m Wiring layer
D1, D1a, D1b, D1c, D1d Magnetic sensor
4 Shake correction coil
4a Coil
5, 5A Control unit
6 Motion sensor
7, 7B Wiring substrate
8 Adhesive
9 Spacer
10 Imaging lens
11 Lens holder
12 Lens unit holder
12a Opening
13, 13a, 13b, 13c, 13d Magnet
14 IR cut filter
15 Shield cover
16 Protective member
W Bonding wire
Ax Reference optical axis
20 Movable unit
21 Memory unit
22 Connector unit
D2 Coil-type sensor
30 TMR sensor
31 MTJ unit
31' MTJ film
32 GMR element
35, 38 Wiring
36 First contact
37 Second contact
39 Hard mask
40 Protective film
45 Soft magnetic body

What is claimed is:

1. An image sensor, comprising:

a semiconductor substrate in which a plurality of pixels each having a photoelectric conversion element is two-dimensionally arranged; and a magnetic detection unit configured to detect a magnetic change according to a change in a relative position with respect to an imaging lens that guides light from a subject to the pixels, wherein the magnetic detection unit has an orthogonal-direction magnetic sensor configured to detect a magnetic change according to a change in the relative position in a direction orthogonal to a reference optical axis of an imaging optical system including the imaging lens, wherein the magnetic detection unit has two pieces of the orthogonal-direction magnetic sensor positioned to face each other at both end portions in a row direction of the image sensor; and two pieces of the orthogonal-direction magnetic sensor positioned to face each other at both end portions in a column direction of the image sensor, and wherein the magnetic detection unit has the orthogonal-direction magnetic sensor individually at a substantially center of each side portion of the image sensor.

2. The image sensor according to claim 1, wherein as the orthogonal-direction magnetic sensor, the magnetic detection unit has:

a first direction magnetic sensor in which a change amount of a detection value according to a change in the relative position in a first direction, the first direction being a predetermined direction among directions orthogonal to the reference optical axis, is larger than a change amount of a detection value according to a change in the relative position in a second direction, the second direction being a direction orthogonal to the reference optical axis and being a direction orthogonal to the first direction; and a second direction magnetic sensor in which a change amount of a detection value according to a change in the relative position in the second direction is larger than a change amount of a detection value according to a change in the relative position in the first direction.

3. The image sensor according to claim 1, wherein a wiring layer is formed on a surface side opposite to a light receiving surface of the semiconductor substrate, and the orthogonal-direction magnetic sensor is formed in the wiring layer.

4. The image sensor according to claim 1, wherein the magnetic detection unit has an axial-direction magnetic sensor constituted by a coil formed on a surface of the semiconductor substrate on a side on which light from the subject is incident.

5. The image sensor according to claim 4, wherein the coil in the axial-direction magnetic sensor is disposed in an outer peripheral region of an effective pixel region.

6. The image sensor according to claim 1, wherein the orthogonal-direction magnetic sensor has an MTJ element as a magnetoresistive effect element.

7. The image sensor according to claim 6, wherein the orthogonal-direction magnetic sensor includes a plurality of the MTJ elements.

8. The image sensor according to claim 1, wherein the orthogonal-direction magnetic sensor has a GMR element as a magnetoresistive effect element.

9. The image sensor according to claim 1, wherein
the magnetic detection unit has a plurality of the orthogonal-direction magnetic sensors, and
the magnetic detection unit includes a soft magnetic body
provided for each of the orthogonal-direction magnetic
sensors.

10. An imaging device, comprising:
an image sensor, including:
a semiconductor substrate in which a plurality of pixels
each having a photoelectric conversion element is
two-dimensionally arranged; and
a magnetic detection unit configured to detect a magnetic change according to a change in a relative
position with respect to an imaging lens that guides
light from a subject to the pixels,
wherein the magnetic detection unit has an orthogonal-direction magnetic sensor configured to detect a magnetic change according to a change in the relative
position in a direction orthogonal to a reference optical
axis of an imaging optical system including the imaging lens,
wherein the magnetic detection unit has two pieces of the
orthogonal-direction magnetic sensor positioned to
face each other at both end portions in a row direction
of the image sensor; and two pieces of the orthogonal-direction magnetic sensor positioned to face each other
at both end portions in a column direction of the image
sensor, and
wherein the magnetic detection unit has the orthogonal-direction magnetic sensor individually at a substantially center of each side portion of the image sensor;
and
an image signal processing unit configured to perform
signal processing on a captured image signal obtained
by the image sensor.

11. An image sensor, comprising:
a semiconductor substrate in which a plurality of pixels
each having a photoelectric conversion element is
two-dimensionally arranged; and
a magnetic detection unit configured to detect a magnetic
change according to a change in a relative position with
respect to an imaging lens that guides light from a
subject to the pixels,
wherein the magnetic detection unit has an orthogonal-direction magnetic sensor configured to detect a magnetic change according to a change in the relative
position in a direction orthogonal to a reference optical
axis of an imaging optical system including the imaging lens,
wherein a wiring layer is formed on a surface side
opposite to a light receiving surface of the semiconductor substrate, and
wherein the orthogonal-direction magnetic sensor is
formed in the wiring layer.

12. The image sensor according to claim 11, wherein
as the orthogonal-direction magnetic sensor, the magnetic
detection unit has:
a first direction magnetic sensor in which a change
amount of a detection value according to a change in
the relative position in a first direction, the first direction being a predetermined direction among directions
orthogonal to the reference optical axis, is larger than a
change amount of a detection value according to a
change in the relative position in a second direction, the
second direction being a direction orthogonal to the
reference optical axis and being a direction orthogonal
to the first direction; and
a second direction magnetic sensor in which a change
amount of a detection value according to a change in
the relative position in the second direction is larger
than a change amount of a detection value according to
a change in the relative position in the first direction.

13. The image sensor according to claim 12, wherein
the magnetic detection unit has:
two pieces of the orthogonal-direction magnetic sensor
positioned to face each other at both end portions in a
row direction of the image sensor; and two pieces of the
orthogonal-direction magnetic sensor positioned to
face each other at both end portions in a column
direction of the image sensor.

14. The image sensor according to claim 13, wherein
the magnetic detection unit has
the orthogonal-direction magnetic sensor individually at
four corner positions of the image sensor.

15. The image sensor according to claim 13, wherein the
magnetic detection unit has the orthogonal-direction magnetic sensor individually at a substantially center of each
side portion of the image sensor.

16. The image sensor according to claim 11, wherein the
magnetic detection unit has an axial-direction magnetic
sensor constituted by a coil formed on a surface of the
semiconductor substrate on a side on which light from the
subject is incident.

17. The image sensor according to claim 16, wherein the
coil in the axial-direction magnetic sensor is disposed in an
outer peripheral region of an effective pixel region.

18. The image sensor according to claim 11, wherein the
orthogonal-direction magnetic sensor has an MTJ element as
a magnetoresistive effect element.

19. The image sensor according to claim 18, wherein
the orthogonal-direction magnetic sensor includes a plurality of the MTJ elements.

20. The image sensor according to claim 11, wherein the
orthogonal-direction magnetic sensor has a GMR element as
a magnetoresistive effect element.

* * * * *